(12) United States Patent
Ishidate et al.

(10) Patent No.: US 8,947,478 B2
(45) Date of Patent: Feb. 3, 2015

(54) LIGHT SCANNING APPARATUS AND IMAGE FORMING APPARATUS

(71) Applicant: Canon Kabushiki Kaisha, Tokyo (JP)

(72) Inventors: Takehiro Ishidate, Tokyo (JP); Yasuaki Otoguro, Abiko (JP); Juichi Kawano, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/201,414

(22) Filed: Mar. 7, 2014

(65) Prior Publication Data

US 2014/0267531 A1    Sep. 18, 2014

(30) Foreign Application Priority Data

Mar. 18, 2013 (JP) ................................ 2013-055016

(51) Int. Cl.
*B41J 2/385* (2006.01)

(52) U.S. Cl.
USPC ........................................................ 347/137

(58) Field of Classification Search
USPC ......... 347/130, 137, 138, 141, 238, 242, 245, 347/257, 258, 261, 263
See application file for complete search history.

(56) References Cited

U.S. PATENT DOCUMENTS

| 7,230,638 | B2* | 6/2007 | Fukutomi | 347/261 |
| 7,522,326 | B1 | 4/2009 | Otoguro | 359/216 |
| 7,684,099 | B2* | 3/2010 | Otoguro | 347/261 |
| 8,330,784 | B2* | 12/2012 | Chun et al. | 347/261 |

FOREIGN PATENT DOCUMENTS

| JP | 2007-121341 | 5/2007 |
| JP | 2009-080174 | 4/2009 |

OTHER PUBLICATIONS

U.S. Appl. No. 14/310,945, filed Jun. 20, 2014.

\* cited by examiner

*Primary Examiner* — Kristal Feggins
(74) *Attorney, Agent, or Firm* — Fitzpatrick, Cella, Harper & Scinto

(57) ABSTRACT

A light scanning apparatus, including: a first holding member configured to hold a first light emitting element configured to emit a first light beam; a second holding member configured to hold a second light emitting element configured to emit a second light beam; a rotary polygon mirror; a first mounting portion on which the first holding member is mounted; and a second mounting portion on which the second holding member is mounted, the second mounting portion being provided adjacent to the first mounting portion, wherein the first mounting portion has a V-shape including two limbs in a cross section, and wherein one limb of the two limbs on the side of the second mounting portion is shorter than other limb of the two limbs on a side opposite to the side of the second mounting portion.

10 Claims, 12 Drawing Sheets

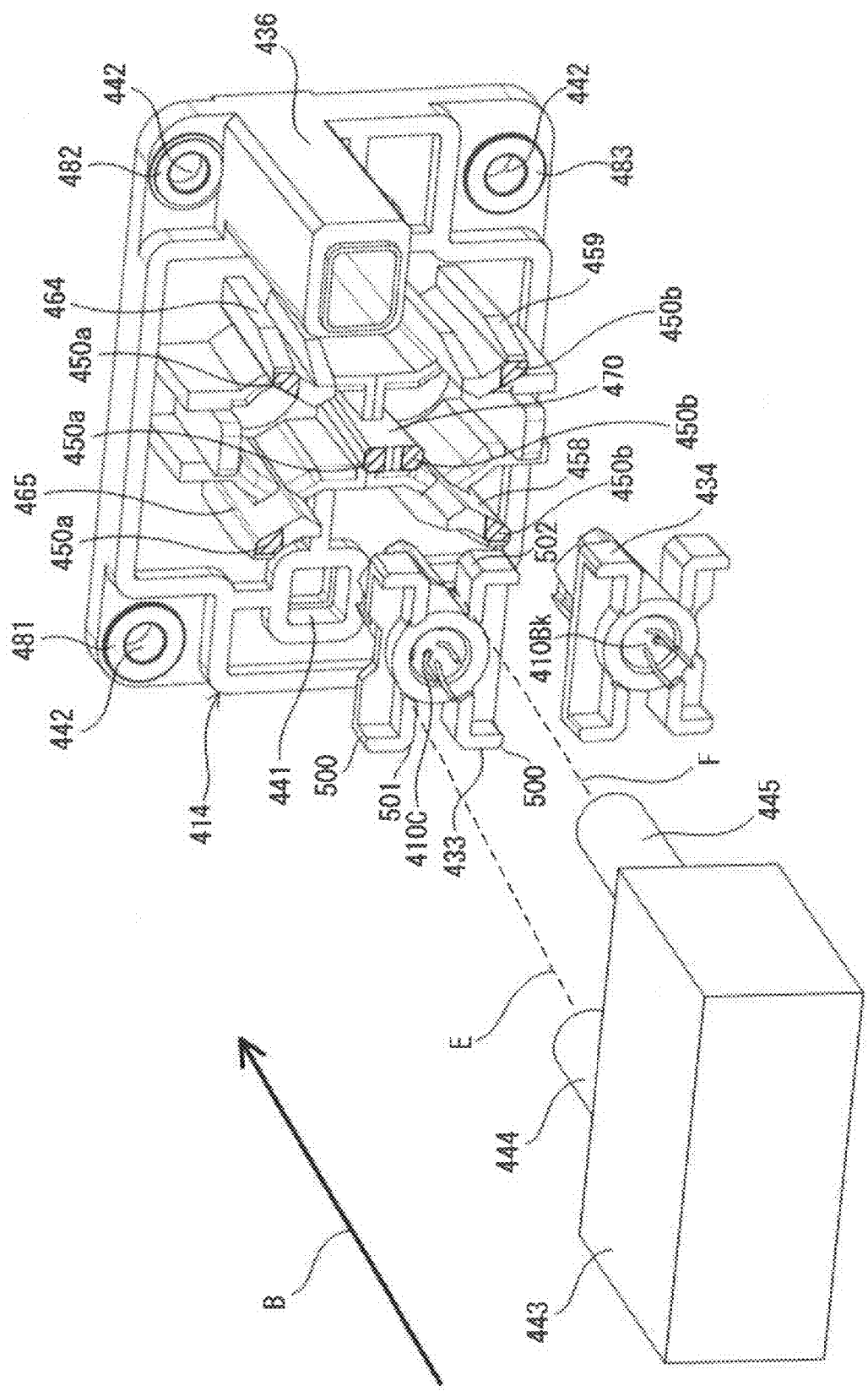

LIGHT SCANNING APPARATUS AND IMAGE FORMING APPARATUS

BACKGROUND OF THE INVENTION

1. Field of the Invention

The present invention relates to a light scanning apparatus and an image forming apparatus including the light scanning apparatus.

2. Description of the Related Art

Hitherto, an image forming apparatus using an electrophotographic printing method includes a light scanning apparatus. The light scanning apparatus scans a uniformly charged surface (scanning surface) of a photosensitive member with a light beam which is modulated according to image information to form an electrostatic latent image on the surface of the photosensitive member. The electrostatic latent image is developed with developer by a developing device to form a toner image. The toner image formed on the photosensitive member is transferred onto a recording medium by a transfer device. The toner image transferred onto the recording medium is fixed to the recording medium by a fixing device, and thus an image is formed on the recording medium.

The light scanning apparatus includes a light source, a deflector, an incident optical system, and an imaging optical system. A light beam emitted from the light source passes through the incident optical system to enter the deflector. The light beam is deflected by the deflector. The deflected light beam is imaged by the imaging optical system as a light spot that scans the photosensitive member at a constant speed. The light source, the deflector, the incident optical system, and the imaging optical system are arranged inside an optical box (hereinafter referred to as "housing") with accuracy.

In recent years, the following light scanning apparatus is known (Japanese Patent Application Laid-Open No. 2007-121341). In order to cause the light beam to enter the deflector at a predetermined angle, the position of a holding member configured to hold the light source is three-dimensionally adjusted with respect to the housing, and then the holding member is fixed to the housing with an adhesive.

FIG. 11A is a view illustrating a holding member 202 fixed to a housing 203 of a conventional light scanning apparatus. A light source 201 is supported by the holding member 202. The housing 203 is provided with a pair of substantially V-shaped bonding ribs 204 which protrudes from the housing 203.

A method of fixing the holding member 202 to the housing 203 is as follows. First, the holding member 202 is chucked by a jig (not shown). The position of the holding member 202 with respect to the housing 203 in a direction parallel to an optical axis OA of the light source 201 (hereinafter referred to as "optical axis direction B") is adjusted by moving the jig (not shown) that chucks the holding member 202 in the optical axis direction B. After the position of the holding member 202 with respect to the housing 203 is adjusted, the holding member 202 is fixed to the bonding ribs 204 of the housing 203 with an adhesive 205.

FIG. 11B is a sectional view taken along a plane that passes through the line XIB-XIB and is parallel to a plane orthogonal to the optical axis OA of the light source 201 of FIG. 11A. The holding member 202 is fixed to the pair of substantially V-shaped bonding ribs 204 which protrudes from the housing 203 with the adhesive 205. The adhesive 205 is an ultraviolet curable adhesive. An ultraviolet curable adhesive cures in a short period of time when being irradiated with ultraviolet light. However, an ultraviolet curable adhesive does not cure in a part that is not irradiated with ultraviolet light. Therefore, in order to prevent the ultraviolet light from being blocked by components arranged around the adhesive 205, spaces S1 are provided extending in the vertical direction on both sides of the adhesive 205 so as to enable insertion of ultraviolet irradiation fibers (not shown). Ultraviolet light is radiated from the ultraviolet irradiation fibers (not shown) inserted through the spaces S1 to the adhesive 205 without being blocked by other components. The adhesive 205 that has cured by the ultraviolet light fixes the holding member 202 to the housing 203.

Japanese Patent Application Laid-Open No. 2007-121341 proposes a light scanning apparatus including a plurality of light sources. FIG. 12A is a view illustrating two holding members 302 fixed to a housing 303 of a conventional light scanning apparatus. The two holding members 302 support light sources 301, respectively. FIG. 12B is a sectional view taken along a plane passing through the line XIIB-XIIB of FIG. 12A. The housing 303 has a pair of substantially V-shaped bonding ribs 304 provided thereon. The housing 303 further has a substantially rhombus-shaped bonding rib 306 provided at a center between the pair of bonding ribs 304.

Each of the two light sources 301 is arranged between the substantially V-shaped bonding rib 304 and the substantially rhombus-shaped bonding rib 306. The pair of substantially V-shaped bonding ribs 304, the two light sources 301, and the substantially rhombus-shaped bonding rib 306 are arranged in alignment with one another. An adhesive 305 is applied between the light source 301 and the bonding rib 304 and between the light source 301 and the bonding rib 306.

As illustrated in FIG. 12B, even when the housing 303 includes the plurality of light sources 301, spaces S2 are provided on both sides of the adhesive 305 in the vertical direction so as to enable insertion of the ultraviolet irradiation fibers (not shown). Ultraviolet light is radiated from the ultraviolet irradiation fibers inserted in the spaces S2 to the adhesive 305 without being blocked by other components. The adhesive 305 that has cured by the ultraviolet light fixes the holding member 302 to the housing 303.

In recent years, downsizing of the image forming apparatus has been desired, and hence downsizing of the light scanning apparatus is demanded. However, as illustrated in FIG. 12B, the substantially rhombus-shaped bonding rib 306 is provided between the two light sources 301, and hence it has been difficult to reduce the distance (light source pitch) between the two light sources 301.

SUMMARY OF THE INVENTION

In view of the above, the present invention has an object to reduce the distance between a plurality of light sources of a light scanning apparatus by forming a gap through which light is radiated toward an application portion to be applied with a photocurable resin adhesive.

In order to solve the above-mentioned problem, according to one embodiment of the present invention, there is provided a light scanning apparatus, including: a first holding member configured to hold a first light emitting element configured to emit a first light beam; a second holding member configured to hold a second light emitting element configured to emit a second light beam; a rotary polygon mirror having a plurality of reflective surfaces, the rotary polygon mirror being configured to deflect the first light beam and the second light beam so that the first light beam is scanned on a first photosensitive member by the plurality of reflective surfaces and the second light beam is scanned on a second photosensitive member by the plurality of reflective surfaces; a housing in which the rotary polygon mirror is mounted; and a mounting member to be mounted on the housing, the mounting member including a first mounting portion on which the first holding member is mounted, and a second mounting portion on which the second holding member is mounted, the second mounting portion being provided adjacent to the first mounting portion to cause the first light beam and the second light beam to enter the same reflective surface among the plurality of reflective surfaces, wherein the first holding member is bonded to the mounting member with a photocurable resin adhesive applied to a first application portion provided between the first holding member and the first mounting portion on a side of the second mounting portion, wherein the mounting member is provided with a gap formed between the first mounting portion and the second mounting portion to radiate light from between the first mounting portion and the second mounting portion toward the first application portion, wherein the first light emitting element and the second light emitting element are arranged in a manner that the first light beam and the second light beam enter the plurality of reflective surfaces from different sides with respect to an imaginary plane that has a normal line corresponding to a rotary shaft of the rotary polygon mirror and passes through the rotary polygon mirror, wherein a first lens configured to convert the first light beam into collimated light and a second lens configured to convert the second light beam into collimated light are mounted in the mounting member, wherein the first mounting portion has a V-shape including two limbs in a cross section perpendicular to a bisector of an angle formed by an optical axis of the first lens and an optical axis of the second lens, wherein the two limbs are opened toward a side opposite to the first holding member, and wherein one limb of the two limbs on the side of the second mounting portion is shorter than other limb of the two limbs on a side opposite to the side of the second mounting portion.

Further features of the present invention will become apparent from the following description of exemplary embodiments with reference to the attached drawings.

BRIEF DESCRIPTION OF THE DRAWINGS

FIG. 8 is a view illustrating the laser holder, a holding member, and a jig.

DESCRIPTION OF THE EMBODIMENTS

Now, an exemplary embodiment of the present invention will be described.

Image Forming Apparatus

Figure 2:
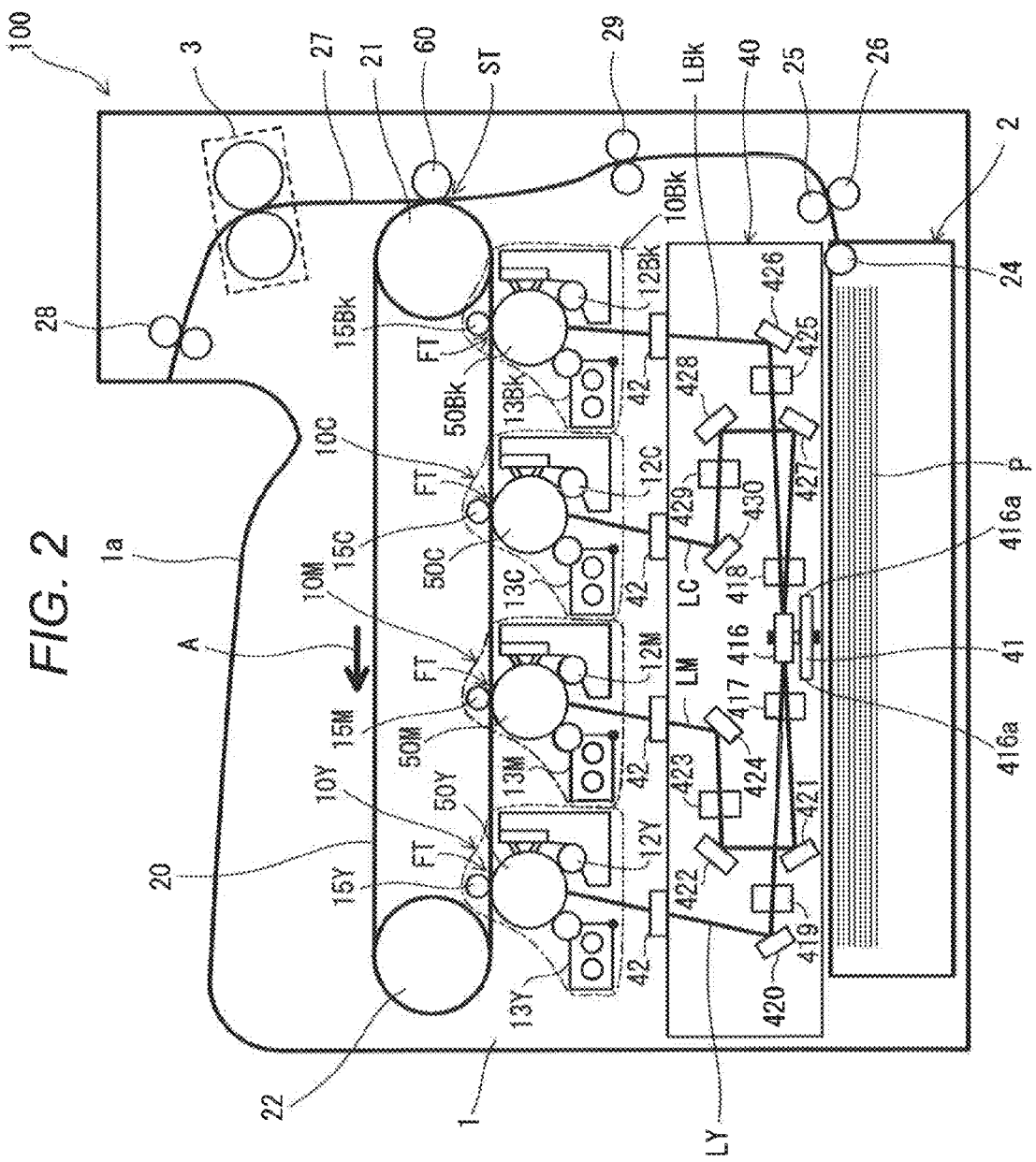
FIG. 2 is a sectional view of an image forming apparatus.

An electrophotographic image forming apparatus (hereinafter referred to as "image forming apparatus") 100 including a light scanning apparatus 40 according to an embodiment of the present invention will be described. FIG. 2 is a sectional view of the image forming apparatus 100. As an example of the image forming apparatus 100, a tandem-type color laser beam printer will be described.

The image forming apparatus 100 forms an image on a recording medium (hereinafter referred to as "sheet") P by an electrophotographic printing method. The image forming apparatus 100 includes four image forming portions 10 (10Y, 10M, 10C, and 10Bk).

Each of the image forming portions 10 includes a photosensitive drum (photosensitive member) 50 (50Y, 50M, 50C, 50Bk) serving as an image bearing member. Around each of the photosensitive members 50, a charging roller (charging device) 12 (12Y, 12M, 12C, 12Bk), a developing device 13 (13Y, 13M, 13C, 13Bk), and a primary transfer roller (primary transfer member) 15 (15Y, 15M, 15C, 15Bk) are arranged. Below the four image forming portions 10, the single light scanning apparatus (exposure apparatus) 40 is arranged.

The developing device 13 stores two-component developer in which a toner and a carrier are mixed.

The image forming apparatus 100 includes an intermediate transfer belt (intermediate transfer member) 20 onto which toner images of a plurality of colors are primarily transferred from the image forming portions 10. The intermediate transfer belt 20 is arranged above the four image forming portions 10. The intermediate transfer belt 20 is an endless belt which is passed over a pair of belt conveying rollers 21 and 22. The intermediate transfer belt 20 rotates in a rotation direction indicated by an arrow A.

The primary transfer roller 15 is arranged across the intermediate transfer belt 20 so as to be opposed to the photosensitive member 50 of the image forming portion 10. The primary transfer roller 15 forms a primary transfer portion FT between the intermediate transfer belt and the photosensitive member 50. When a transfer voltage is applied to the primary transfer roller 15, a transfer electric field is formed at the primary transfer portion FT. A charged toner image formed on the photosensitive member 50 is primarily transferred onto the intermediate transfer belt 20 by a Coulomb force in the transfer electric field at the primary transfer portion FT.

The four image forming portions 10Y, 10M, 10C, 10Bk are arranged in parallel to one another under the intermediate transfer belt 20. Along the rotation direction A of the intermediate transfer belt 20, the yellow image forming portion 10Y, the magenta image forming portion 10M, the cyan image forming portion 10C, and the black image forming portion 10Bk are arranged in the stated order. The image forming portions 10 form a yellow toner image, a magenta toner image, a cyan toner image, and a black toner image with the respective color toners.

A secondary transfer roller 60 is arranged across the intermediate transfer belt 20 so as to be opposed to the belt conveying roller 21. The belt conveying roller 21 and the secondary transfer roller 60 form a secondary transfer portion ST between the intermediate transfer belt 20 and the secondary transfer roller 60.

In a lower part of a main body 1 of the image forming apparatus 100, a sheet feeding cassette 2 configured to contain the sheets P is provided. The sheet feeding cassette 2 is removably mounted in the lower part of the main body 1 from a lateral side of the main body 1. On the upper side of the sheet feeding cassette 2, a pick-up roller 24 and a sheet feeding roller 25 are provided. The pick-up roller 24 and the sheet feeding roller 25 feed one by one the sheets P contained in the sheet feeding cassette 2. In order to prevent the double feed of the sheets P, a retard roller 26 is arranged so as to be opposed to the sheet feeding roller 25.

A conveyance path 27 of the sheet P inside the main body 1 is provided substantially vertically along the right side surface of the main body 1. A registration roller pair 29, the secondary transfer portion ST, a fixing device 3, and a delivery roller pair 28 are provided in the conveyance path.

Image Forming Process

An image forming process in the image forming apparatus 100 will be described below.

The charging roller 12 uniformly charges the surface of the photosensitive member 50. The light scanning apparatus 40 exposes the uniformly-charged surface of the photosensitive member 50 with laser light (hereinafter referred to as "light beam") L (LY, LM, LC, LBk) modulated according to image information of each color, to form an electrostatic latent image on the surface of the photosensitive member 50. The developing device 13 develops the electrostatic latent image with the toner of each color to form a toner image of each color on the photosensitive member 50.

Four toner images formed by the four image forming portions 10 are primarily transferred by the primary transfer rollers 15 onto the intermediate transfer belt 20 rotating in the rotation direction A, and are superimposed one on top of another on the intermediate transfer belt 20.

On the other hand, the sheet P is fed from the sheet feeding cassette 2 to the registration roller pair 29 by the pick-up roller 24 and the sheet feeding roller 25. The registration roller pair 29 coveys the sheet P to the secondary transfer portion ST between the secondary transfer roller 60 and the intermediate transfer belt 20 in synchronization with the toner images superimposed on the intermediate transfer belt 20.

The toner images superimposed on the intermediate transfer belt 20 are collectively secondarily transferred onto the sheet P at the secondary transfer portion ST.

The sheet P on which the toner images are transferred is conveyed upward along the conveyance path 27. The sheet P is conveyed to the fixing device 3 provided above the secondary transfer portion ST.

The fixing device 3 heats and pressurizes the sheet P to fix the toner image onto the sheet P. In this manner, a full-color image is formed on the sheet P.

The sheet P on which the full-color image is formed is delivered by the delivery roller pair 28 to a delivery tray 1a provided in an upper part of the main body 1.

Light Scanning Apparatus

As described above, in the full-color image forming of the image forming apparatus 100, the light scanning apparatus 40 exposes each of the photosensitive members 50Y, 50M, 50C, and 50Bk of the image forming portions 10 with light according to image information of each color at a predetermined timing for each image forming portion. With this, a toner image of each color corresponding to the image information of the each color is formed on each of the photosensitive members 50. In this case, in order to obtain a high quality full-color image, the light scanning apparatus 40 is required to form the electrostatic latent images at positions reproduced with high accuracy.

In the following, with reference to FIGS. 2, 3, and 4, the light scanning apparatus 40 will be described.

As illustrated in FIG. 2, the light scanning apparatus 40 is arranged below the plurality of image forming portions 10. The light scanning apparatus 40 exposes the surface of the photosensitive member 50 provided in each of the plurality of image forming portions with the light beam L (LY, LM, LC, LBk) which is modulated according to image information of each color.

In this embodiment, the single light scanning apparatus 40 is shared with the plurality of image forming portions 10Y, 10M, 10C, and 10Bk. However, the image forming apparatus 100 may use a plurality of light scanning apparatus. For example, one of two light scanning apparatus may emit the light beams LY and LM, while the other light scanning apparatus may emit the light beams LC and LBk.

Figure 3:
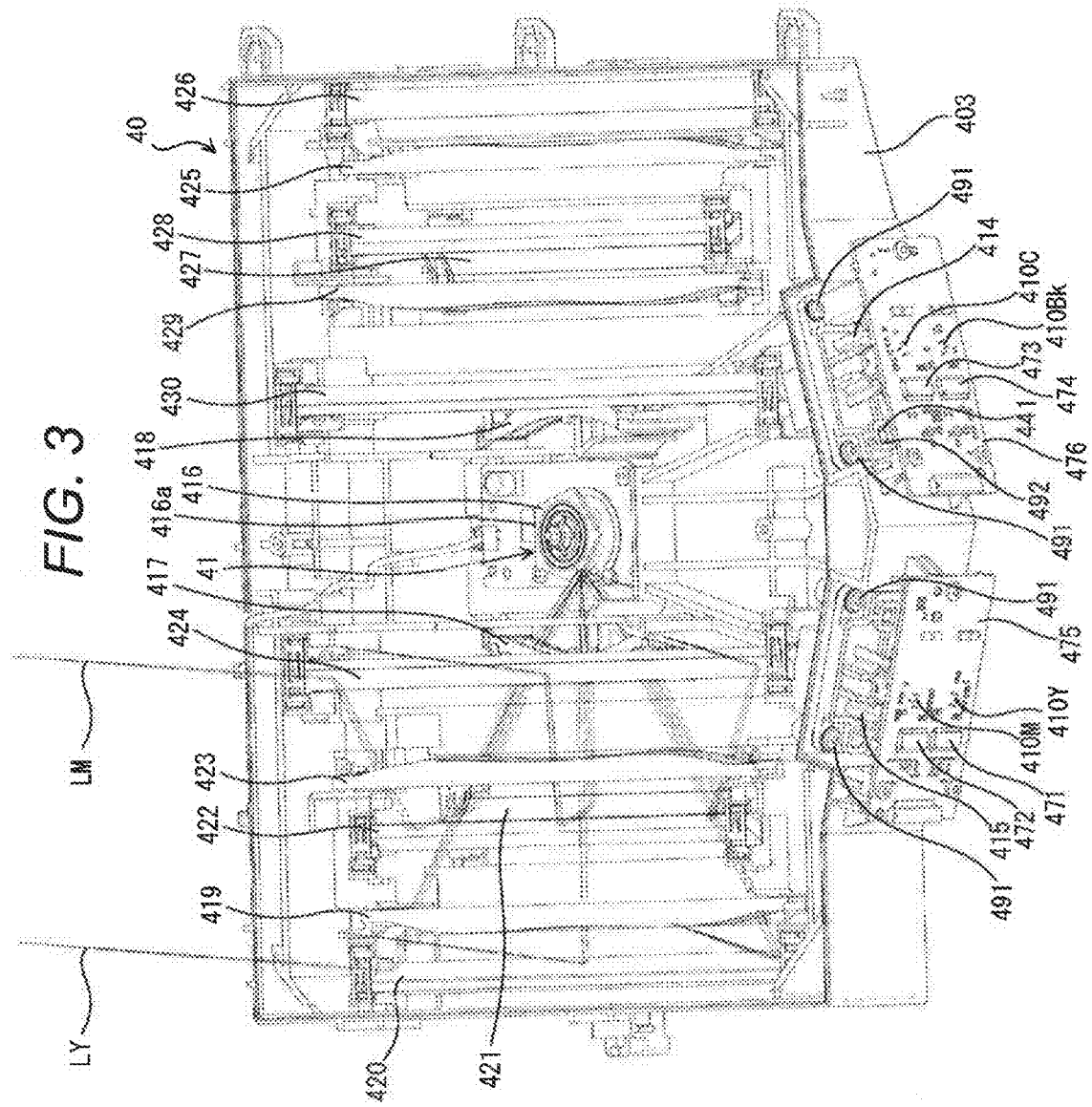
FIG. 3 is a perspective view of a light scanning apparatus.
Figure 4:
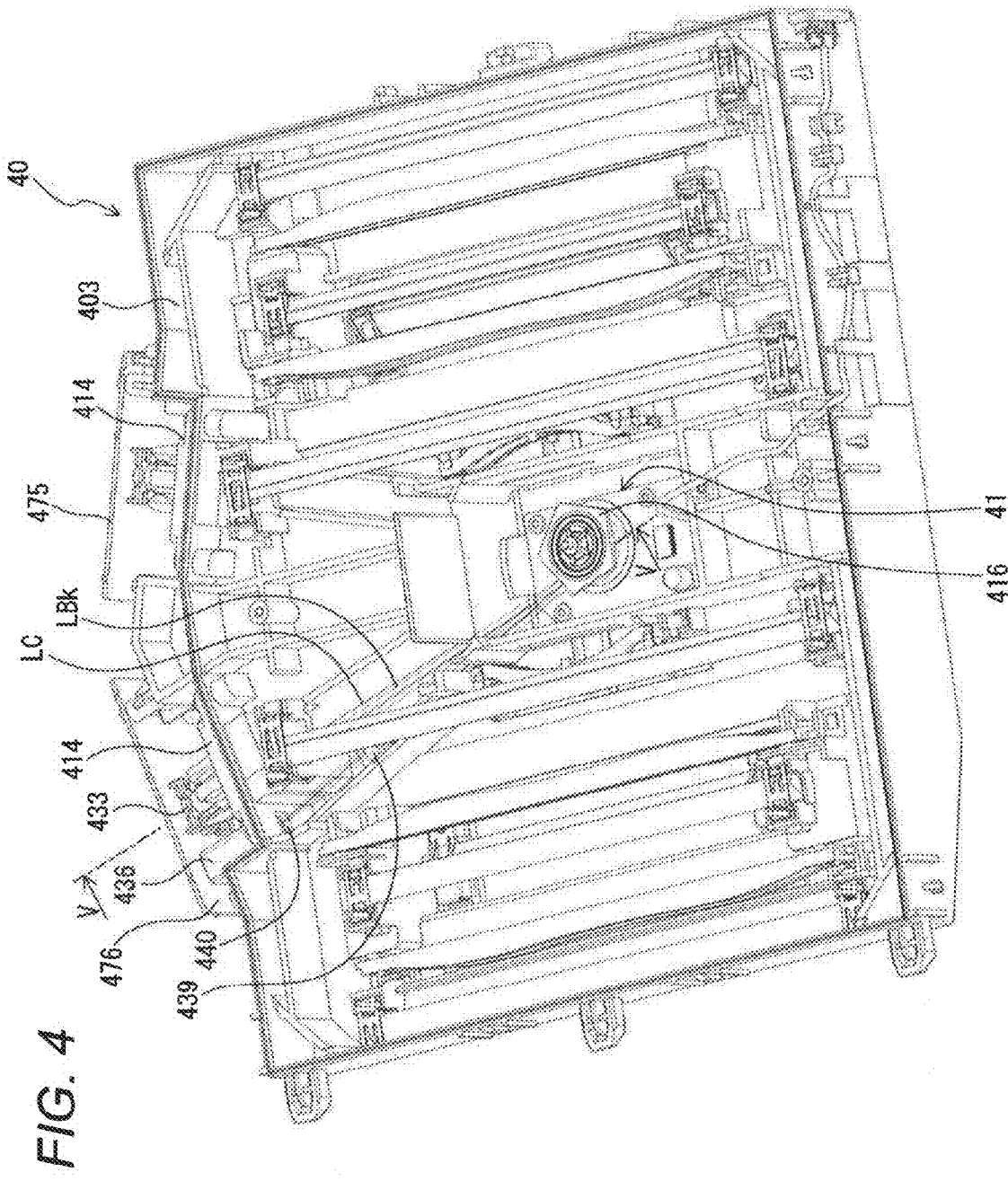
FIG. 4 is a perspective view of the light scanning apparatus.

FIGS. 3 and 4 are perspective views of the light scanning apparatus 40 provided in the image forming apparatus 100. In FIGS. 3 and 4, in order to describe the internal structure of an optical box (hereinafter referred to as "housing") 403 of the light scanning apparatus 40, a cover (not shown) is removed from the housing 403.

The light scanning apparatus 40 includes semiconductor lasers (light emitting elements) 410, a deflecting device 41, an incident optical system, an imaging optical system, the housing 403, and the cover (not shown). The housing 403 holds the semiconductor lasers 410, the deflecting device 41, the incident optical system, and the imaging optical system. The cover (not shown) covers an upper opening of the housing 403 to seal the housing 403 so as to prevent dust from entering the housing 403.

In the light scanning apparatus 40 of this embodiment, four light beams enter the single deflecting device 41. The two light beams LY and LM enter the left side of the deflecting device 41, and the two light beams LC and LBk enter the right side of the deflecting device 41. FIG. 3 illustrates the light beams LY and LM on the left side of the deflecting device 41 for reference.

The light scanning apparatus 40 radiates the four light beams LY, LM, LC, and LBk to the photosensitive members 50Y, 50M, 50C, and 50Bk of the image forming portions 10Y, 10M, 10C, and 10Bk, respectively.

The light scanning apparatus 40 includes the plurality of (four in this embodiment) semiconductor lasers (hereinafter each referred to as "light source") 410 (410Y, 410M, 410C, and 410Bk) which emit the light beams L (LY, LM, LC, and LBk) corresponding to the plurality of colors, respectively. The number of the light sources 410 is not limited to four. The number is determined as necessary, and may be two, three, five, etc. The light scanning apparatus 40 includes substrates 475 and 476 including laser driving circuits 471, 472, 473, and 474 configured to modulate light beams (laser light) according to image information from the image forming apparatus 100 or an external apparatus.

The light sources 410 (410Y, 410M, 410C, and 410Bk) emit the light beams L (LY, LM, LC, and LBk) modulated according to respective image information. The light beams L pass through the incident optical system (an anamorphic collimation lens 435 to be described later) to enter the deflecting device 41.

The deflecting device 41 deflects the four light beams in order to scan the surfaces of the respective photosensitive members 50 with the respective light beams L in a main scanning direction (axial direction of the photosensitive member 50). The deflecting device 41 includes a rotary polygon mirror (hereinafter referred to as "deflector") 416 including a plurality of reflective surfaces 416a, and a motor configured to rotate the deflector 416 at high speed. The deflector 416 is mounted in the housing 403. In this embodiment, the deflecting device 41 uses the rotary polygon mirror as the deflector, but may use a galvanometer mirror which swings a mirror as the deflector. Further, the number of deflectors 416 is not limited to one, and a plurality of deflectors may be provided.

The respective light beams L deflected by the deflector 416 travel through respective optical paths while being guided by the imaging optical system (417 to 430) provided in the light scanning apparatus 40. Then, the respective light beams L pass through irradiation window glasses 42 (FIG. 2) provided in the upper part of the light scanning apparatus 40 to expose the respective photosensitive members 50Y, 50M, 50C, and 50Bk of the image forming portions 10 with the light beams L.

The light beam (first light beam) LBk is deflected by the plurality of reflective surfaces 416*a* of the rotating deflector 416 to be scanned on the photosensitive member (first photosensitive member) 50Bk. The light beam (second light beam) LC is deflected by the plurality of reflective surfaces 416*a* of the rotating deflector 416 to be scanned on the photosensitive member (second photosensitive member) 50C. The light beam (third light beam) LM is deflected by the plurality of reflective surfaces 416*a* of the rotating deflector 416 to be scanned on the photosensitive member (third photosensitive member) 50M. The light beam (fourth light beam) LY is deflected by the plurality of reflective surfaces 416*a* of the rotating deflector 416 to be scanned on the photosensitive member (fourth photosensitive member) 50Y.

The imaging optical system (417 to 430) includes an optical lens (fθ lens) configured to scan, at a constant speed, the surface (scanning surface) of the photosensitive member 50 with the light beam L scanned by the deflector 416 at a constant angular speed. The optical lens (fθ lens) includes a plurality of lenses of first optical lenses (spherical lenses) 417 and 418 and second optical lenses (toric lenses) 419, 423, 425, and 429. However, the number of optical elements forming the optical lens is not limited thereto.

The first optical lens 417 is shared with the yellow light beam LY and the magenta light beam LM. The first optical lens 418 is shared with the cyan light beam LC and the black light beam LBk. The second optical lenses 419, 423, 425, and 429 are arranged for the yellow light beam LY, the magenta light beam LM, the black light beam LBk, and the cyan light beam LC, respectively.

Further, in order to guide the deflected light beams L to the photosensitive members 50, respectively, mirrors 420, 421, 422, 424, 426, 427, 428, and 430 are arranged in the respective optical paths.

The optical elements (lenses and mirrors) 417 to 430 of the imaging optical system are positioned and fixed by respective mounting portions (positioning units) of the housing 403.

With reference to FIG. 4, a main scanning synchronization sensor (hereinafter referred to as "BD sensor") configured to generate a main scanning synchronization signal for synchronizing the timings of start of image signal writing in the main scanning direction will be described.

A laser holder (mounting member) 414 (FIG. 8) to be described later includes a holding member 434 configured to hold the light source 410Bk, and a lens barrel portion 436. The light beam LBk emitted from the light source 410Bk enters the deflector 416. The light beam LBk is reflected by the deflector 416. The reflected light beam LBk enters a BD lens 439. The BD lens 439 condenses the light beam LBk. The condensed light beam LBk passes through an opening 440 provided in the housing 403 to enter the lens barrel portion 436 provided in the laser holder 414. The light beam LBk that has entered the lens barrel portion 436 is received by the BD sensor (not shown) provided to the substrate 476. The BD sensor (not shown) is a light receiving element configured to generate the main scanning synchronization signal (reference signal for the beginning of writing in the main scanning direction) for each scanning. The main scanning synchronization signal is used to keep the print position (writing start position of the light beam) constant in the main scanning direction of an image. Here, BD stands for "beam detect".

Note that, the main scanning direction is a direction perpendicular to a rotary shaft (or swing shaft) of the deflector 416. Regarding the main scanning direction, the incident optical system (the anamorphic collimation lens 435 to be described later) from the light source 410 to the deflector 416 and the imaging optical system (417 to 430) from the deflector 416 to the photosensitive member 50 have different optical axis directions. A sub-scanning direction is a direction perpendicular to the optical axis of the incident optical system or the imaging optical system, and is a direction (direction parallel to the rotary shaft (or swing shaft) of the deflector) perpendicular to the main scanning direction. A main scanning cross section is a cross section taken along a plane that includes the optical axis of the incident optical system or the imaging optical system and is parallel to the main scanning direction. A sub-scanning cross section is a cross section taken along a plane that includes the optical axis of the incident optical system or the imaging optical system and is perpendicular to the main scanning cross section.

Light Source

Figure 5:
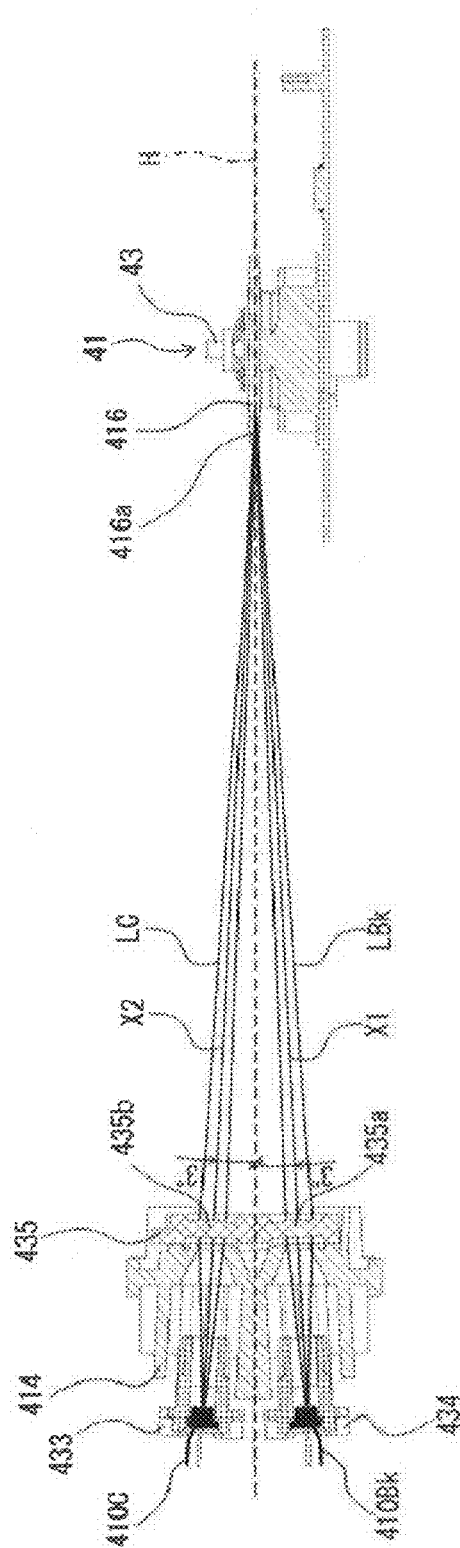
FIG. 5 is a sub-scanning sectional view of the light scanning apparatus.

FIG. 5 is a sectional view taken along the line V-V of FIG. 4. FIG. 5 is a sub-scanning sectional view illustrating the light beams LC and LBk that are emitted from the light sources 410C and 410Bk of the light scanning apparatus 40, respectively, and enter the deflector 416 of the deflecting device 41. The deflector 416 deflects the light beam (first light beam) LBk emitted from the light source (first light emitting element) 410Bk and the light beam (second light beam) LC emitted from the light source (second light emitting element) 410C. The light source 410Bk and the light source 410C are arranged adjacent to each other so that the light beam LBk and the light beam LC enter the same reflective surface among the plurality of reflective surfaces 416*a* of the deflector 416.

The holding member (first holding member) 434 holds the light source (first light emitting element) 410Bk. A holding member (second holding member) 433 holds the light source (second light emitting element) 410C. The light sources 410C and 410Bk are press-fitted and fixed to the holding members 433 and 434, respectively. The positions of the holding members 433 and 434 are three-dimensionally adjusted with respect to the laser holder 414 on which the anamorphic collimation lens 435 is mounted. After that, the holding members 433 and 434 are fixed to the laser holder 414 with an adhesive.

The light sources 410C and 410Bk are arranged so that the light beams LC and LBk emitted from the light sources 410C and 410Bk are inclined by 3° and declined by 3° with respect to an optical horizontal plane (imaginary plane) H indicated by dotted lines in FIG. 5. The optical horizontal plane H is an imaginary plane whose normal line corresponds to the rotary shaft 43 of the deflector 416, the imaginary plane passing through the deflector 41. The light sources 410C and 410Bk are arranged so that the light beams LC and LBk enter the plurality of reflective surfaces 416*a* from different sides with respect to the optical horizontal plane H.

The anamorphic collimation lens 435 includes a first lens 435*a* configured to convert the light beam LBk emitted from the light source 410Bk into collimated light, and a second lens 435*b* configured to convert the light beam LC emitted from the light source 410C into collimated light. The optical horizontal plane H includes a bisector of an angle formed by an optical axis X1 of the first lens 435a and an optical axis X2 of the second lens 435b.

Then, each of the light beams LC and LBk that have entered the anamorphic collimation lens 435 is condensed in the shape of a line in the sub-scanning direction to enter the deflector 416. By the rotation of the deflector 416, the light beams LC and LBk deflected by the deflector 416 irradiate the photosensitive members 50C and 50Bk of the image forming portions 10C and 10Bk, respectively, as illustrated in FIG. 2.

Note that, when a beam synthesizing prism is used, the optical axis of the light source 410C may be parallel to the optical axis of the light source 410Bk.

Arrangement Of Light Sources

Now, the arrangement of the light sources will be described.

Figure 12A:
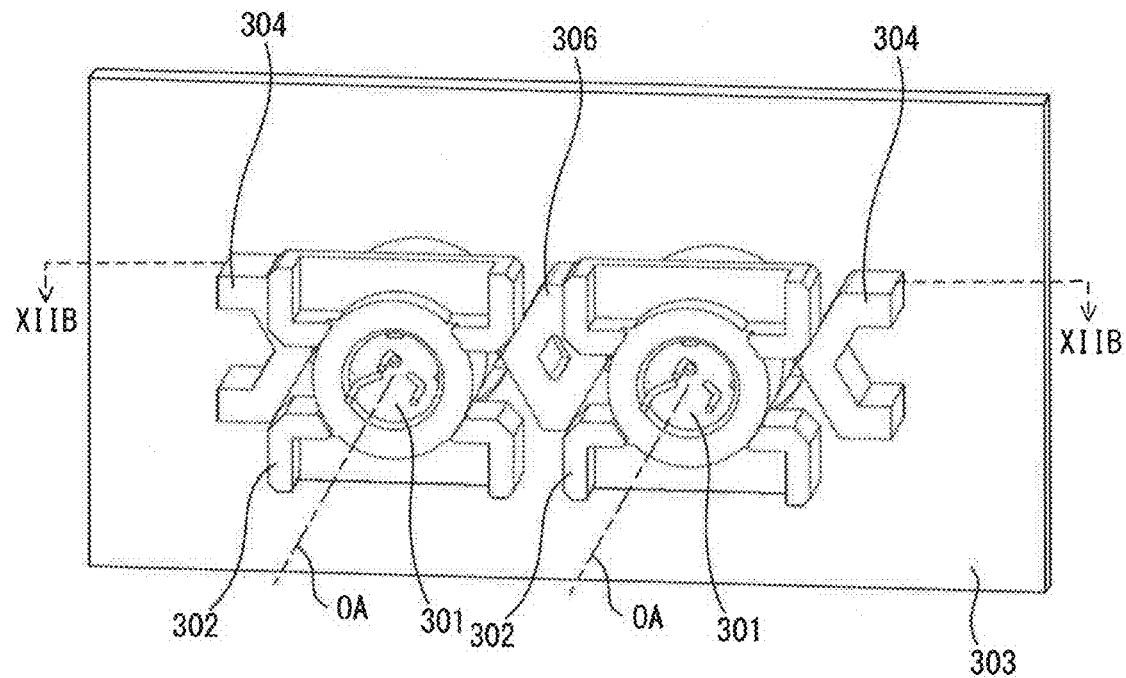
FIGS. 12A and 12B are views illustrating two holding members fixed to a housing of a conventional light scanning apparatus.
Figure 12B:
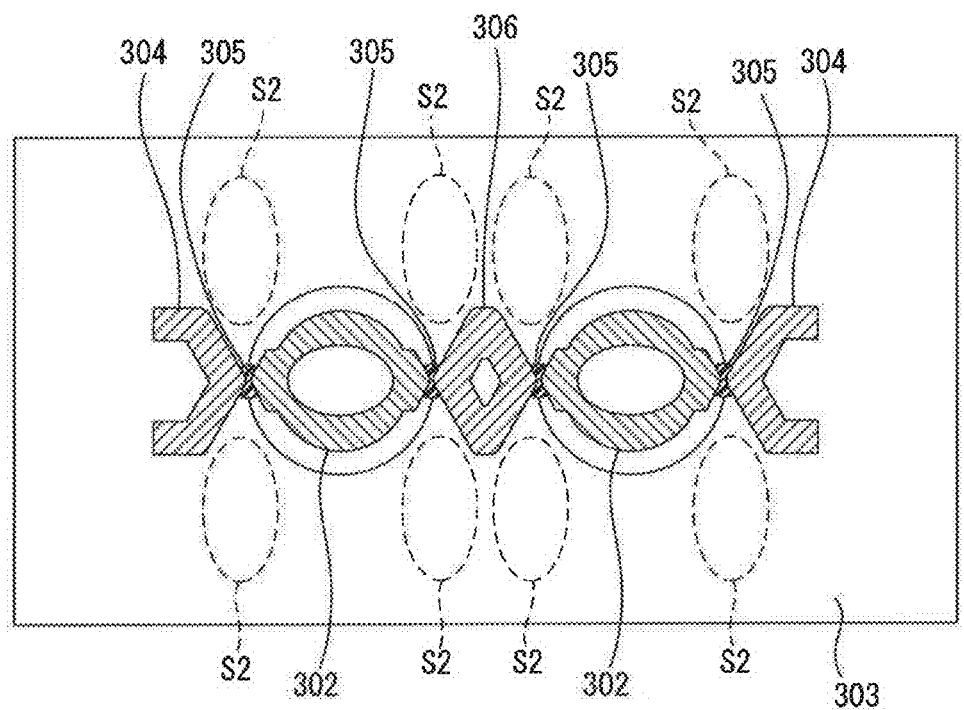

In the conventional light scanning apparatus, as illustrated in FIG. 12B, a plurality of bonding portions at which the adhesive 305 is provided are arranged in alignment, and hence the substantially rhombus-shaped bonding rib 306 has been required to be provided between the plurality of holding members 302. The substantially rhombus-shaped bonding rib 306 has inhibited further downsizing of the light scanning apparatus.

Figure 6A:
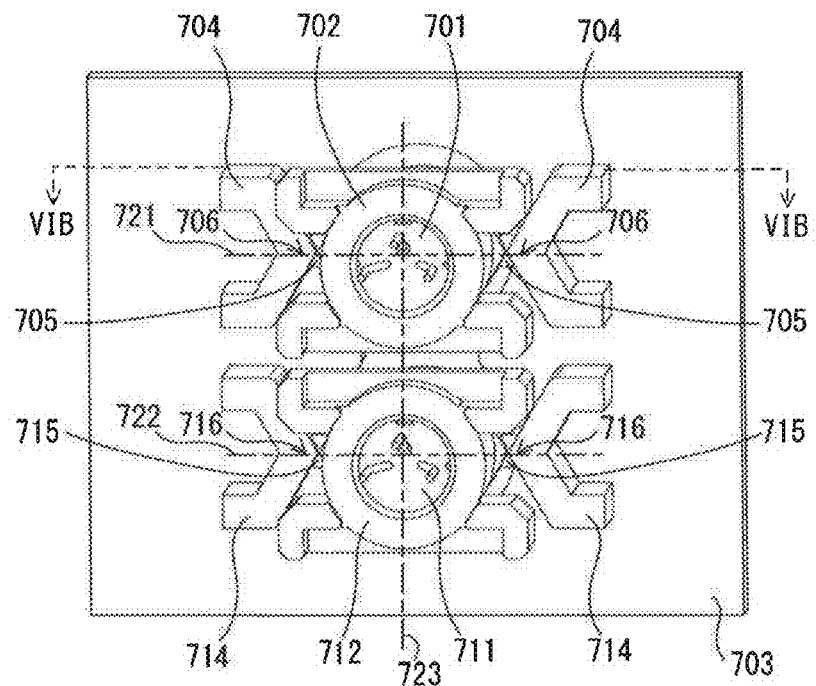
FIGS. 6A and 6B are views illustrating a reference example of arrangement of two light sources.

In view of this, in order to omit the substantially rhombus-shaped bonding rib 306, as illustrated in FIG. 6A, holding members 702 and 712 which hold a plurality of light sources 701 and 711, respectively, are arranged in parallel to each other.

Figure 6B:
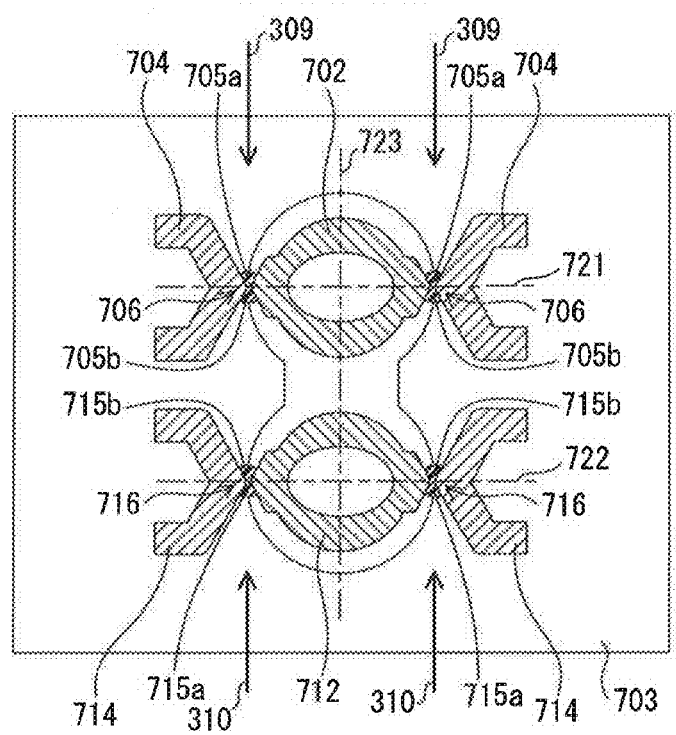

FIGS. 6A and 6B are views illustrating a reference example of the arrangement of the two light sources 701 and 711. FIG. 6A is a view illustrating the two light sources 701 and 711 fixed to a housing 703 of the light scanning apparatus. FIG. 6B is a sectional view taken along a plane passing through the line VIB-VIB of FIG. 6A. The housing 703 is provided with two pairs of substantially V-shaped bonding ribs 704 and 714.

One pair of substantially V-shaped bonding ribs 704 is provided in parallel to the other pair of substantially V-shaped bonding ribs 714. The holding members 702 and 712 are fixed to the bonding ribs 704 and 714 with ultraviolet curable adhesives (photocurable resin adhesives) 705 and 715, respectively.

Two bonding portions 706 of one holding member 702 and two bonding portions 716 of the other holding member 712 are not arranged in alignment. The two bonding portions 706 of the one holding member 702 are arranged in parallel to the two bonding portions 716 of the other holding member 712. That is, a line 721 connecting together the two bonding portions 706 each provided between the one holding member 702 and the bonding rib 704 is parallel to a line 722 connecting together the two bonding portions 716 each provided between the other holding member 712 and the bonding rib 714. The line 721 connecting together the two bonding portions 706 and the line 722 connecting together the two bonding portions 716 are substantially perpendicular to a line 723 connecting together the two light sources 701 and 711.

With such an arrangement of the light sources, the substantially rhombus-shaped bonding rib 306 of the conventional art can be omitted. With this, the distance (light source pitch) between the two light sources 701 and 711 can be further reduced. Therefore, the light scanning apparatus 40 can be further downsized. As in this reference example, in the case where the two light beams emitted from the respective two light sources 701 and 711 enter the single deflector 41 at an angle with each other, the light source pitch is reduced so that the angle formed by the optical axes of the plurality of light sources can get closer to parallel. When the optical axes of the plurality of light sources are brought close to parallel, even if the optical elements are misaligned within a range of a predetermined amount, the misalignment of the light spot formed on the scanning surface can be reduced.

However, as illustrated in FIG. 6B, it is difficult to secure optical paths of ultraviolet light (light beam) for curing the ultraviolet curable adhesives 705 and 715 provided at the bonding portions 706 and 716, respectively. Ultraviolet light can be radiated to adhesives 705a on an outer side of the respective bonding portions 706 of the holding member 702 along ultraviolet irradiation optical paths 309. Therefore, the adhesives 705a can be cured. However, regarding adhesives 705b on an inner side of the respective bonding portions 706 of the holding member 702, the substantially V-shaped bonding ribs 704 and 714 are provided in the way, and hence the optical path for ultraviolet light cannot be secured. Therefore, the adhesives 705b cannot be cured. Similarly, ultraviolet light can be radiated to adhesives 715a on an outer side of the respective bonding portions 716 of the holding member 712 along ultraviolet irradiation optical paths 310. Therefore, the adhesives 715a can be cured. However, regarding adhesives 715b on an inner side of the respective bonding portions 716 of the holding member 712, the substantially V-shaped bonding ribs 704 and 714 are provided in the way, and hence the optical path for ultraviolet light cannot be secured. Therefore, the adhesives 715b cannot be cured.

Figure 7A:
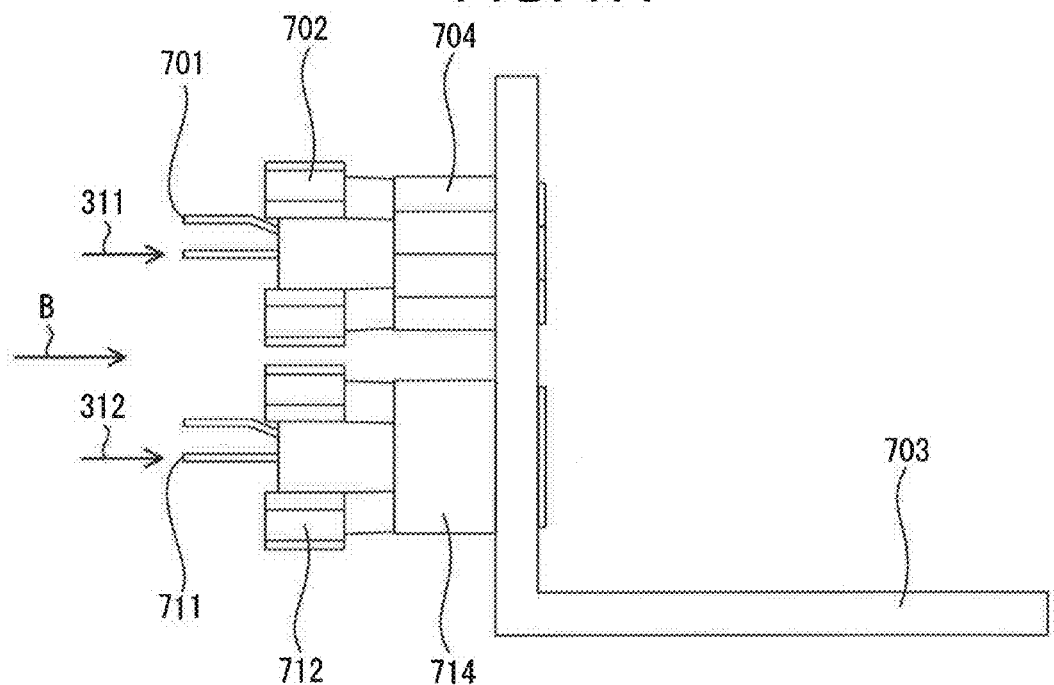
FIGS. 7A and 7B are explanatory views of ultraviolet irradiation along an optical axis.
Figure 7B:
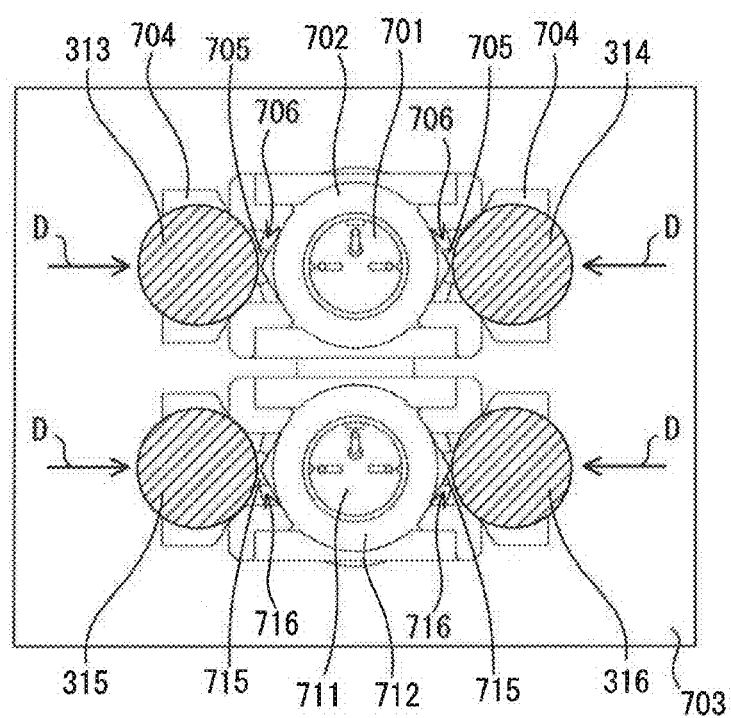

FIGS. 7A and 7B are explanatory views of a case where ultraviolet light is radiated along the optical axis direction B of each of the light sources 701 and 711. As illustrated in FIG. 7A, ultraviolet light is radiated to the adhesives 705 at the respective bonding portions 706 of the holding member 702 along an ultraviolet irradiation optical path 311 parallel to the optical axis direction B of the light source 701. Similarly, ultraviolet light is radiated to the adhesives 715 at the respective bonding portions 716 of the holding member 712 along an ultraviolet irradiation optical path 312 parallel to the optical axis direction B of the light source 711.

However, as illustrated in FIG. 7B, it is necessary to press chucks 313 and 314 of a jig (not shown) in directions indicated by arrows D to hold the holding member 702, to three-dimensionally adjust the position of the light source 701. Similarly, it is necessary to press chucks 315 and 316 of a jig (not shown) in directions indicated by arrows D to hold the holding member 712, to three-dimensionally adjust the position of the light source 711. Therefore, the ultraviolet irradiation optical paths 311 and 312 are blocked by the chucks 313 to 316, and hence the ultraviolet irradiation optical paths 311 and 312 are not always secured. Even when the ultraviolet irradiation optical paths 311 and 312 are secured, the adhesives 705 and 715 applied to the respective bonding portions 706 and 716 each have a length in the optical axis direction B. Therefore, parts of the adhesives 705 and 715 on the side of the housing 703 may be shaded by parts of the adhesives 705 and 715 on the front side (outer side).

Therefore, in the arrangement of the light sources 701 and 711 illustrated in FIG. 6A, which is devised to reduce the light source pitch, the adhesives 705b and 715b located on the inner side of both of the holding members 702 and 712 are uncured in high possibility. When the adhesives 705b and 715b are uncured, the bonding strength for holding the holding members 702 and 712 may be insufficient.

In view of this, in this embodiment, the laser holder 414 configured to secure the ultraviolet irradiation optical paths is provided. The laser holder 414 realizes a simple configuration configured to three-dimensionally adjust the positions of the two light sources 410Y and 410M or 410C and 410Bk with respect to the housing 403, and then fix the light sources with an adhesive.

Adjustment Of Positions Of Light Sources

FIG. 8 is a perspective view illustrating a jig 443 and the laser holder 414. The jig 443 is used to three-dimensionally adjust the positions of the holding members 433 and 434 configured to hold the light sources 410C and 410Bk with respect to the laser holder 414. Although not illustrated in FIG. 8, the anamorphic collimation lens 435 illustrated in FIG. 5 is mounted to the rear surface of the laser holder 414. The positions of the light sources 410C and 410Bk are adjusted with respect to the anamorphic collimation lens 435.

The laser holder 414 is provided with a positioning opening portion 441 which is fitted onto a positioning protrusion 492 (FIG. 3) of the housing 403 so that the laser holder 414 is positioned with respect to the housing 403. Further, the laser holder 414 is provided with openings 442 through which screws 491 (FIG. 3) extend to fasten the laser holder 414 to the housing 403.

The dedicated jig 443 is used to adjust the positions of the holding members 433 and 434 with respect to the anamorphic collimation lens 435, that is, with respect to the laser holder 414 on which the anamorphic collimation lens 435 is mounted. The positions of the holding members 433 and 434 are each adjusted separately.

First, adjustment of the position of the holding member (second holding member) 433 configured to hold the light source (second light emitting element) 410C will be described. At the time of start of the adjustment, as indicated by dotted lines E and F of FIG. 8, chucks 444 and 445 of the jig 443 engage with V-shaped cutout portions 501 and 502 provided at both end portions of flange portions 500 of the holding member 433. The V-shaped cutout portions 501 and 502 are not limited to the shape illustrated in FIG. 8. Instead of the V-shaped cutout portions 501 and 502, the holding member 433 may have a part to be sandwiched by the chucks 444 and 445 of the jig 443.

The chucks 444 and 445 sandwich the holding member 433 to hold the holding member 433. The chucks 444 and 445 move in the optical axis direction indicated by the arrow B of FIG. 8 in a state of holding the holding member 433. The laser holder 414 has three initial positioning planes (abutting surfaces) 450a for the holding member 433 and three initial positioning planes (abutting surfaces) 450b for the holding member 434. The laser holder 414 includes bonding ribs (first mounting portions) 458 and 459 on which the holding member 434 is mounted, bonding ribs (second mounting portions) 464 and 465 on which the holding member 433 is mounted, and a central rib 470. The three initial positioning planes 450a are provided at a top of the bonding rib (second mounting portion) 464, a top of the bonding rib (second mounting portion) 465, and a top of the central rib 470, respectively. The three initial positioning planes 450b are provided at a top of the bonding rib (first mounting portion) 458, a top of the bonding rib (first mounting portion) 459, and a top of the central rib 470, respectively.

The bonding ribs (second mounting portions) 464 and 465 are provided adjacent to the bonding ribs (first mounting portions) 458 and 459 so that the light beam LBk and the light beam LC enter the same reflective surface among the plurality of reflective surfaces 416a of the deflector 416.

The bonding ribs 458, 459, 464, and 465, and the central rib 470 may be provided on the housing 403. In this embodiment, the pair of bonding ribs 464 and 465 is provided for the holding member 433, but instead, a plurality of bonding ribs of three or more may be provided. Similarly, the pair of bonding ribs 458 and 459 is provided for the holding member 434, but instead, a plurality of bonding ribs of three or more may be provided.

A reference surface (not shown) of the holding member 433 held by the chucks 444 and 445 abuts against the three initial positioning planes 450a. With this, the light source 410C assumes a correct attitude in which the light source 410C confronts the laser holder 414, that is, the anamorphic collimation lens 435. Then, the holding member 433 is separated from the initial positioning planes 450a by a nominal design distance to complete the initial positioning.

Figure 9A:
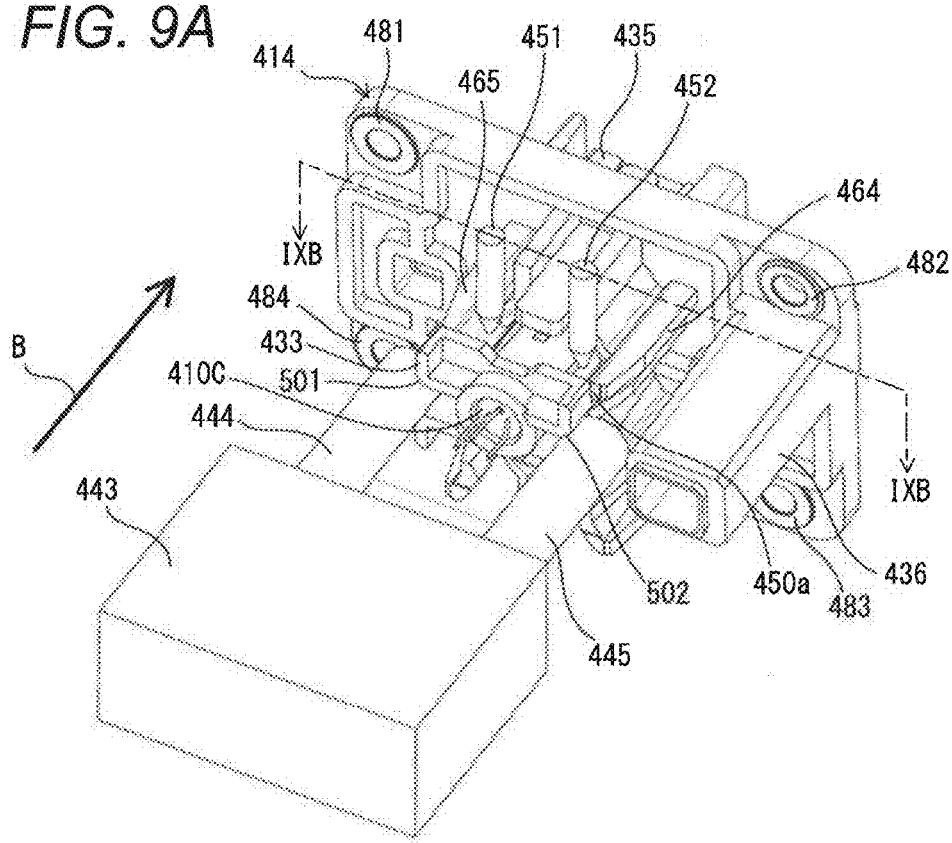
FIGS. 9A and 9B are views illustrating a state in which the initial positioning of the holding member is completed.

FIG. 9A is a perspective view illustrating a state in which the initial positioning of the holding member 433 is completed. The holding member 433 held by the chucks 444 and 445 is arranged at a nominal design position. After the initial positioning of the holding member 433 is completed, a photocurable resin adhesive for bonding the holding member 433 to the laser holder 414 is dropped from dispensers (ejection devices) 451 and 452 of the jig 443.

The photocurable resin adhesive does not cure until light for curing is radiated to the adhesive, but cures in a short period of time when the light for curing is radiated to the adhesive. In this embodiment, an ultraviolet curable adhesive is used. However, the photocurable resin adhesive is not limited to the ultraviolet curable adhesive.

The light source 410C emits the light beam LC. The light beam LC is imaged in a jig viewing system by a jig lens (not shown) arranged on an optical axis to detect the focus and the irradiation position. The detection result is fed back to the jig 443, and the position of the jig 443 is finely adjusted. With this, the holding member 433, that is, the light source 410C is three-dimensionally adjusted to a predetermined position with respect to the laser holder 414, that is, the anamorphic collimation lens 435.

Bonding Step

Figure 9B:
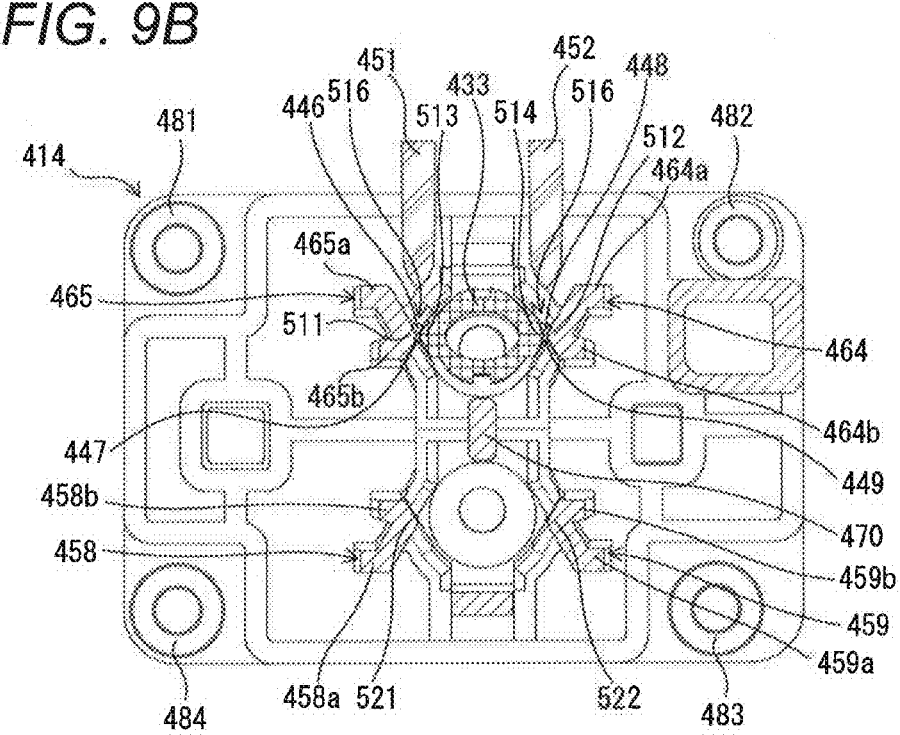

FIG. 9B is a sectional view taken along a plane (plane perpendicular to the optical horizontal plane H) that passes through the line IXB-IXB of FIG. 9A.

The bonding ribs 458, 459, 464, and 465 are provided so as to protrude from the laser holder 414. The bonding ribs 458, 459, 464, and 465 each have a V-shape including two limbs in a cross section perpendicular to a bisector of an angle formed by the optical axis X1 of the first lens 435a and the optical axis X2 of the second lens 435b.

The two limbs of the bonding rib 458 are opened toward the side opposite to the holding member 434. One limb of the two limbs of the bonding rib 458 on the side of the bonding rib 465 is shorter than the other limb on the side opposite to the bonding rib 465. The two limbs of the bonding rib 459 are opened toward the side opposite to the holding member 434. One limb of the two limbs of the bonding rib 459 on the side of the bonding rib 464 is shorter than the other limb on the side opposite to the bonding rib 464.

The two limbs of the bonding rib 464 are opened toward the side opposite to the holding member 433. One limb of the two limbs of the bonding rib 464 on the side of the bonding rib 459 is shorter than the other limb on the side opposite to the bonding rib 459. The two limbs of the bonding rib 465 are opened toward the side opposite to the holding member 433. One limb of the two limbs of the bonding rib 465 on the side of the bonding rib 458 is shorter than the other limb on the side opposite to the bonding rib 458.

That is, the bonding ribs 458, 459, 464, and 465 each have a shape in which, in a cross section perpendicular to the optical horizontal plane H, one wing portion is cut out from a substantially V-shape including two wing portions (two limbs). The substantially V-shape refers to a shape including two wing portions and a connecting portion configured to connect together the two wing portions, and is hereinafter simply referred to as "V-shape". An angle between the two wing portions is not always required to be an acute angle, and may be an obtuse angle.

The bonding rib may have a substantially V-shape in a cross section perpendicular to the optical axis of the light source. Further, the bonding rib may have a substantially triangle shape without a wing portion. In this case, the bonding rib has a shape in which one side of the triangle shape is cut shorter than another side thereof.

Figure 1A:
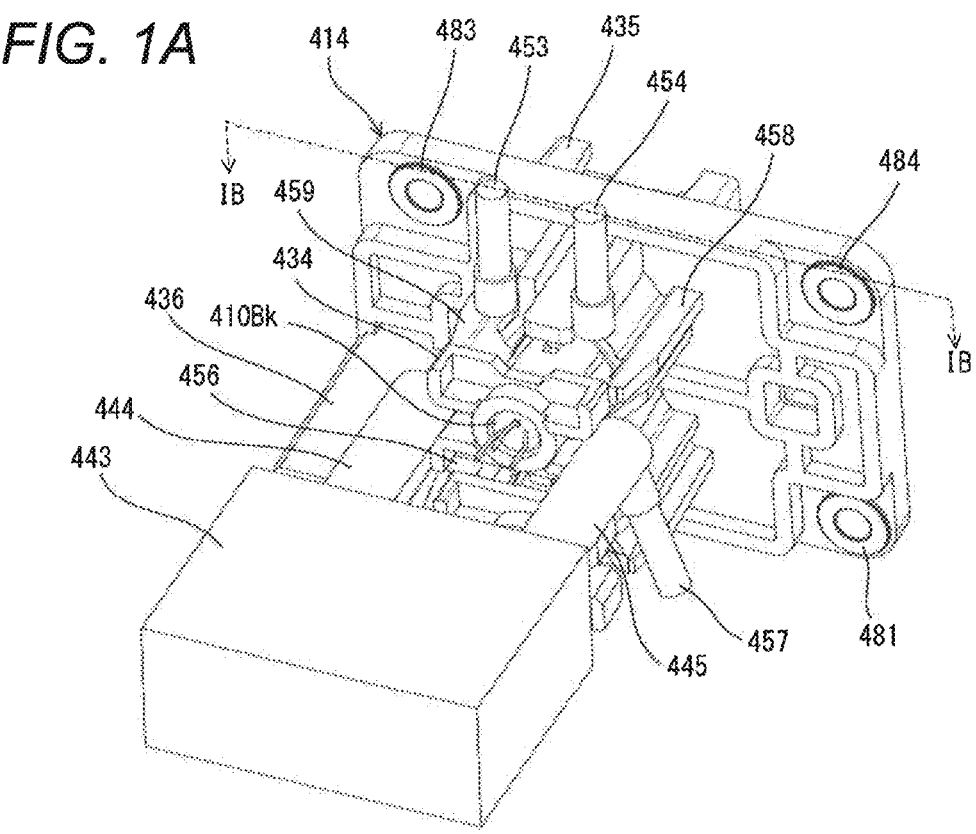
FIGS. 1A and 1B are views illustrating a laser holder in which ultraviolet irradiation fibers are inserted.
Figure 1B:
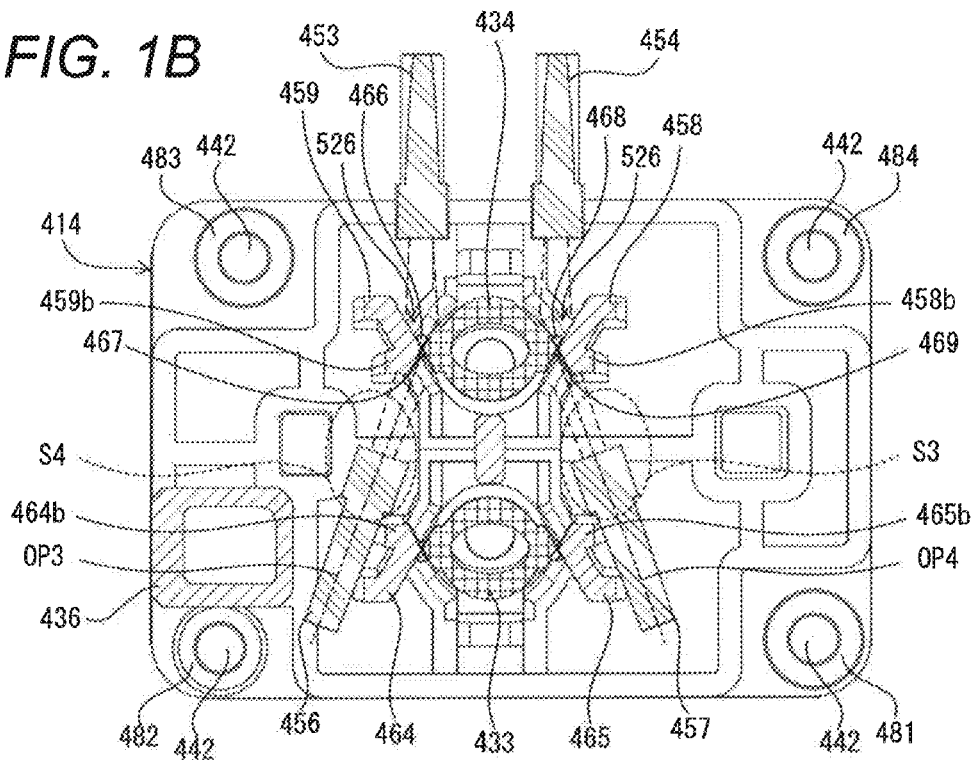

The bonding rib (second mounting portion) 464 has two wing portions (two limbs) 464a and 464b, and the bonding rib (second mounting portion) 465 has two wing portions (two limbs) 465a and 465b. The wing portions (limbs) 464a, 464b, 465a, and 465b are opened toward the sides opposite to the holding member (second holding member) 433. The bonding rib (first mounting portion) 458 has two wing portions (two limbs) 458a and 458b, and the bonding rib (first mounting portion) 459 has two wing portions (two limbs) 459a and 459b. The wing portions (limbs) 458a, 458b, 459a, and 459b are opened toward the sides opposite to the holding member (first holding member) 434 (FIG. 1B).

The bonding ribs 458, 459, 464, and 465 each include a wing portion and a short wing portion. The wing portion and the short wing portion are connected to each other while forming an obtuse angle therebetween. That is, one wing portion (one limb) is longer than the other short wing portion (the other limb). The short wing portions 464b and 465b of the respective bonding ribs 464 and 465 on the side of the bonding ribs 458 and 459 are shorter than the wing portions 464a and 465a on the side opposite to the bonding ribs 458 and 459. The short wing portions 458b and 459b of the respective bonding ribs 458 and 459 on the side of the bonding ribs 464 and 465 are shorter than the wing portions 458a and 459a on the side opposite to the bonding ribs 464 and 465.

The bonding rib 458 includes the wing portion 458a, the short wing portion 458b, and a bonding protrusion 521 provided on the connecting portion between the wing portion 458a and the short wing portion 458b. The bonding rib 459 includes the wing portion 459a, the short wing portion 459b, and a bonding protrusion 522 provided on the connecting portion between the wing portion 459a and the short wing portion 459b. The bonding rib 464 includes the wing portion 464a, the short wing portion 464b, and a bonding protrusion 512 provided on the connecting portion between the wing portion 464a and the short wing portion 464b. The bonding rib 465 includes the wing portion 465a, the short wing portion 465b, and a bonding protrusion 511 provided on the connecting portion between the wing portion 465a and the short wing portion 465b.

The bonding protrusions 511 and 512 of the laser holder 414 each have a shape in which, in the cross section (cross section perpendicular to the optical horizontal plane H) illustrated in FIG. 9B, a gap between the bonding protrusion 511 or 512 and the holding member 433 increases toward both sides from a part that is closest to the holding member 433.

The holding member 433 includes bonding protrusions 513 and 514 for bonding and fixing the holding member 433 to the laser holder 414. The bonding protrusions 513 and 514 of the holding member 433 each have a shape in which, in the cross section (cross section perpendicular to the optical horizontal plane H) illustrated in FIG. 9B, a gap between the bonding protrusion 513 or 514 and the laser holder 414 increases toward both sides from a part that is closest to the laser holder 414.

A bonding portion (gap) 516 is formed between the bonding protrusion 511 of the laser holder 414 and the bonding protrusion 513 of the holding member 433. Similarly, a bonding portion (gap) 516 is formed between the bonding protrusion 512 of the laser holder 414 and the bonding protrusion 514 of the holding member 433.

A photocurable resin adhesive (hereinafter referred to as "adhesive") dropped to fourth application portions 446 and 448 from the dispensers 451 and 452 accumulates in the two bonding portions 516 formed between the holding member 433 and the laser holder 414, and flows in the gravity direction (downward in FIG. 9B). As illustrated in FIG. 9B, the two bonding portions 516 each have a shape that expands in the vertical direction from the minimum gap point. The adhesive applied to the fourth application portions 446 and 448 passes through the two bonding portions 516 to reach second application portions 447 and 449 in lower parts of the bonding portions 516. The adhesive has a high viscosity which prevents the adhesive from flowing out from the bonding portions 516 during the bonding step. The adhesive having a high viscosity is dropped from above, and hence the volume of the adhesive applied to each of the fourth application portions 446 and 448 on the upper side (outer side) of the bonding portion 516 is larger than the volume of the adhesive applied to each of the second application portions 447 and 449 on the lower side (inner side) of the bonding portion 516.

A range of each of the bonding protrusions 511 to 514 in the optical axis direction B in which the adhesive is applied includes the position of a light emitting point of the light source 410C.

It is preferred that an apex angle of each of the bonding protrusions 511 to 514 be an obtuse angle. At least one of the plurality of bonding portions 516 may be arranged at a position shifted from another bonding portion in the optical axis direction B.

Next, a method of curing the adhesive will be described.

Figure 10A:
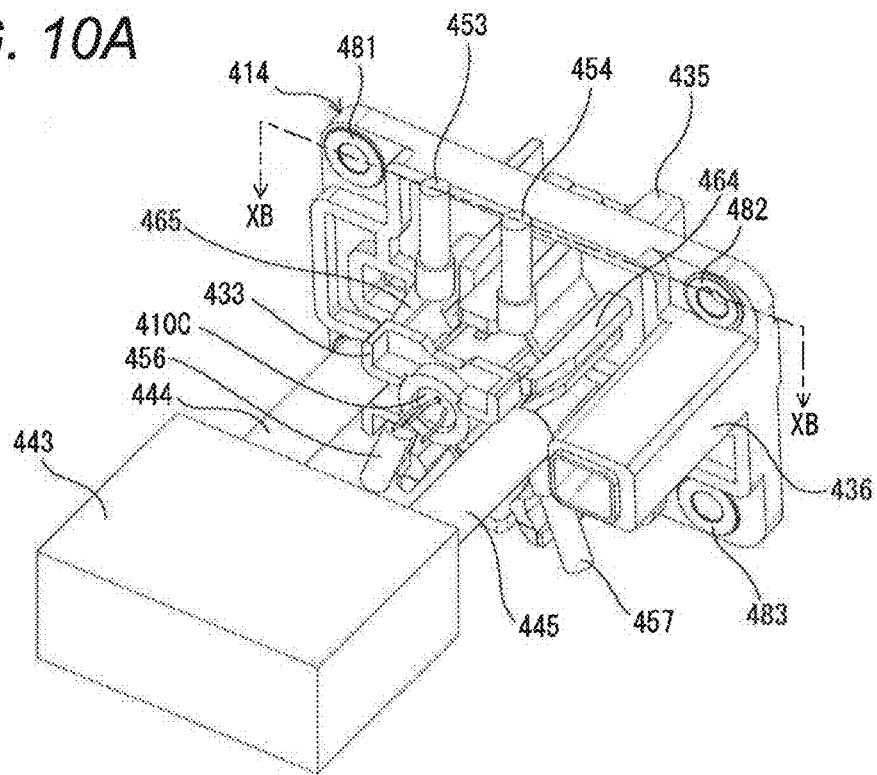
FIGS. 10A and 10B are views illustrating the laser holder in which the ultraviolet irradiation fibers are inserted.
Figure 10B:
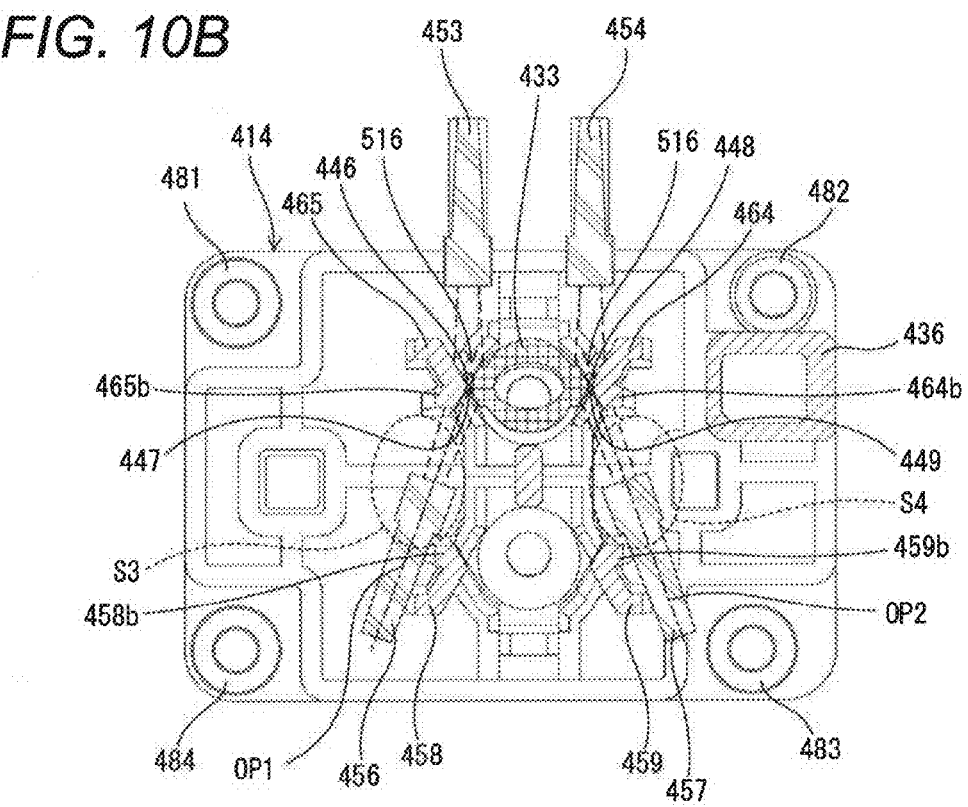
Figure 11A:
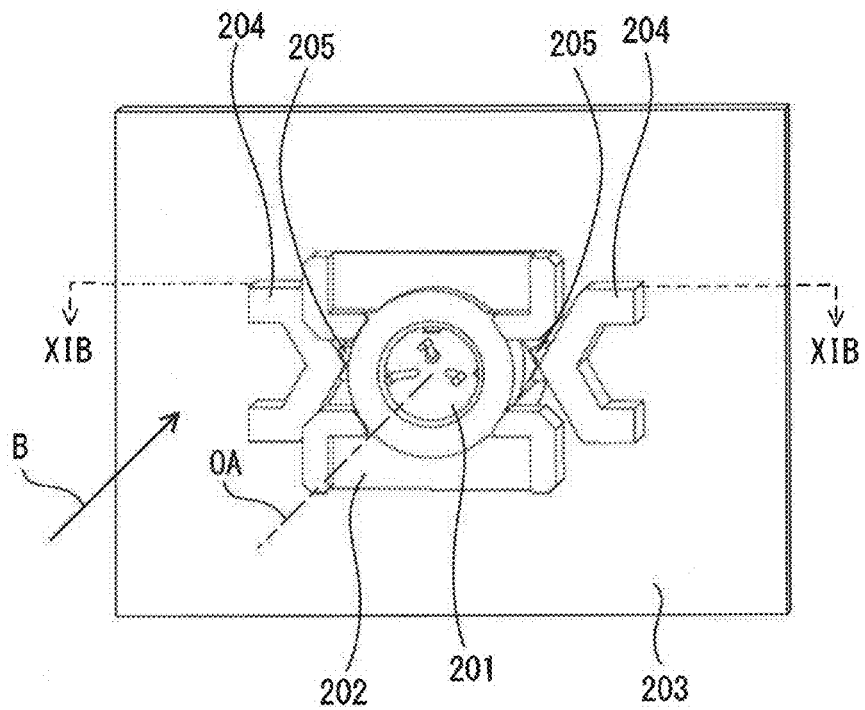
FIGS. 11A and 11B are views illustrating a holding member fixed to a housing of a conventional light scanning apparatus.
Figure 11B:
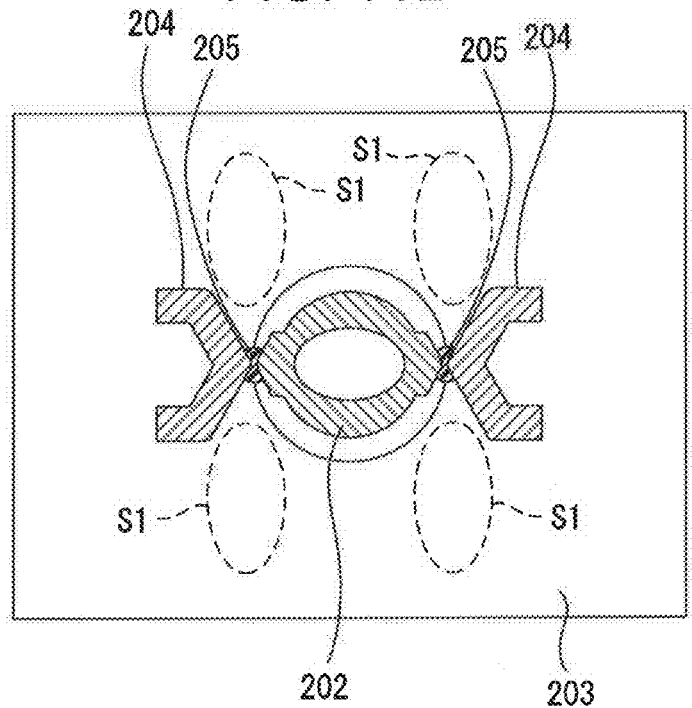

FIGS. 10A and 10B are views illustrating the laser holder 414 having ultraviolet irradiation fibers 453, 454, 456, and 457 inserted therein.

FIG. 10A is a perspective view illustrating the laser holder 414 in which the ultraviolet irradiation fibers 453, 454, 456, and 457 are inserted after the position of the holding member 433 is adjusted. The dispensers 451 and 452 illustrated in FIGS. 9A and 9B are retreated from the laser holder 414. Instead, the ultraviolet irradiation fibers (hereinafter each referred to as "UV irradiation fiber") 453 and 454 serving as light guides are inserted into the laser holder 414 from above toward the adhesive applied to the fourth application portions 446 and 448. Further, the UV irradiation fibers 456 and 457 are inserted into the laser holder 414 from obliquely below toward the adhesive applied to the second application portions 447 and 449.

FIG. 10B is a sectional view taken along a plane passing through the line XB-XB of FIG. 10A.

As illustrated in FIG. 10B, the holding member 433 is bonded to the laser holder 414 with the adhesive applied to each of the second application portion 447 provided between the holding member 433 and the bonding rib 465 on the side of the bonding rib 458 and the second application portion 449 provided between the holding member 433 and the bonding rib 464 on the side of the bonding rib 459. Further, the holding member 433 is bonded to the laser holder 414 with the adhesive applied to each of the fourth application portion 446 provided between the holding member 433 and the bonding rib 465 on the side opposite to the bonding rib 458 and the fourth application portion 448 provided between the holding member 433 and the bonding rib 464 on the side opposite to the bonding rib 459. The amount of the adhesive applied to each of the second application portions 447 and 449 is smaller than the amount of the adhesive applied to each of the fourth application portions 446 and 448.

In order to radiate ultraviolet light (light) toward the adhesive applied to each of the inner second application portions 447 and 449 from between the bonding rib 458 and the bonding rib 465 and from between the bonding rib 459 and the bonding rib 464, the UV irradiation fibers 456 and 457 are inserted from obliquely below. In order to radiate ultraviolet light (light) toward the adhesive applied to each of the fourth application portions 446 and 448, the UV irradiation fibers 453 and 454 are inserted from above.

In the reference example, as described above, UV irradiation optical paths for the ultraviolet light for radiating the adhesive applied to the inner second application portions 447 and 449 are not secured, and hence fixing with the adhesive is impossible. On the other hand, in this embodiment, the V-shaped bonding ribs 458 and 459 are shaped to avoid (bypass) UV irradiation optical paths OP1 and OP2, that is, the UV irradiation fibers 456 and 457. That is, the short wing portion 465b of the bonding rib 465 defines, together with the short wing portion 458b of the bonding rib 458 opposed to the bonding rib 465, a gap (space) S3 in which the UV irradiation fiber 456 can be inserted. The gap S3 is formed between the bonding rib 458 and the bonding rib 465. Further, the short wing portion 464b of the bonding rib 464 defines, together with the short wing portion 459b of the bonding rib 459 opposed to the bonding rib 464, a gap (space) S4 in which the UV irradiation fiber 457 can be inserted. The gap S4 is formed between the bonding rib 459 and the bonding rib 464.

Therefore, ultraviolet light can be sufficiently radiated to even the adhesive applied to each of the inner second application portions 447 and 449. Thus, the bonding strength of the bonding portion 516 can be enhanced. After the position of the holding member 433 configured to hold the light source 410C is three-dimensionally adjusted with respect to the laser holder 414, the holding member 433 can be fixed to the laser holder 414 with high reliability.

It is preferred that each of the holding member 433 and the housing 403 be formed of a non-transparent member. The adhesive does not have a shaded part, and hence it is unnecessary to form the holding member 433 and the housing 403 with a transparent resin. Therefore, a low-cost and high-rigidity non-transparent member can be used.

Subsequently, adjustment and bonding of the holding member (first holding member) 434 configured to hold the other light source (first light emitting element) 410Bk will be described with reference to FIGS. 1A and 1B. When the position of the holding member 434 is adjusted, the laser holder 414 illustrated in FIG. 10A is placed upside down as illustrated in FIG. 1A. Under this state, the chucking of the holding member 434, the initial positioning, the three-dimensional adjustment, and the application of the photocurable resin adhesive by the dispensers 451 and 452 are performed by methods similar to the above.

FIG. 1B is a sectional view taken along a plane passing through the line IB-IB of FIG. 1A. This step differs from the step of bonding the holding member 433 in that the holding member 433 configured to hold the light source 410C is already bonded to the laser holder 414.

As illustrated in FIG. 1B, the holding member 434 is bonded to the laser holder 414 with an adhesive applied to each of a first application portion 467 provided between the holding member 434 and the bonding rib 459 on the side of the bonding rib 464 and a first application portion 469 provided between the holding member 434 and the bonding rib 458 on the side of the bonding rib 465. Further, the holding member 434 is bonded to the laser holder 414 with an adhesive applied to each of a third application portion 466 provided between the holding member 434 and the bonding rib 459 on the side opposite to the bonding rib 464 and a third application portion 468 provided between the holding member 434 and the bonding rib 458 on the side opposite to the bonding rib 465. The amount of the adhesive applied to each of the first application portions 467 and 469 is smaller than the amount of the adhesive applied to each of the third application portions 466 and 468.

As illustrated in FIG. 1A, in order to radiate ultraviolet light (light) toward the adhesive applied to the third application portions 466 and 468, the UV irradiation fibers 453 and 454 are inserted from above. In order to radiate ultraviolet light (light) toward the adhesive applied to the inner first application portions 467 and 469 from between the bonding rib 459 and the bonding rib 464 and from between the bonding rib 458 and the bonding rib 465, the UV irradiation fibers 456 and 457 are inserted from obliquely below.

The V-shaped bonding rib (second mounting portion) 465 has a shape which forms, together with the holding member (second holding member) 433 configured to hold the light source (second light emitting element) 410C, the bonding portion (first bonding portion) 516 to which the adhesive is applied. The V-shaped bonding rib (first mounting portion) 458 has a shape which forms, together with the holding member (first holding member) 434 configured to hold the light source (first light emitting element) 410Bk provided adjacent to the light source 410C, a bonding portion (second bonding portion) 526 to which the adhesive is applied. The V-shaped bonding rib (first mounting portion) 458 is provided opposite to the V-shaped bonding rib (second mounting portion) 465 on the laser holder (mounting member) 414.

The V-shaped bonding rib (second mounting portion) 464 and the V-shaped bonding rib (first mounting portion) 459 are also formed substantially similar so as to be bilaterally symmetric to the V-shaped bonding rib (second mounting portion) 465 and the V-shaped bonding rib (first mounting portion) 458.

The V-shaped bonding ribs 464 and 465 are shaped so as to avoid (bypass) UV irradiation optical paths OP3 and OP4, that is, the UV irradiation fibers 456 and 457, respectively. That is, the short wing portion 465b of the bonding rib 465 defines, together with the short wing portion 458b of the bonding rib 458 opposed to the bonding rib 465, the gap (space) S3 in which the UV irradiation fiber 457 can be inserted. The gap S3 is formed between the bonding rib 458 and the bonding rib 465. Further, the short wing portion 464b of the bonding rib 464 defines, together with the short wing portion 459b of the bonding rib 459 opposed to the bonding rib 464, the gap (space) S4 in which the UV irradiation fiber 456 can be inserted. The gap S4 is formed between the bonding rib 459 and the bonding rib 464.

That is, the bonding rib 465 is shaped so as to form the gap S3 for securing the optical path OP4 provided to radiate light from the side of the bonding rib 465 toward the first application portion 469 of the bonding portion 526 opposite to the bonding rib 465. Further, the bonding rib 464 is shaped so as to form the gap S4 for securing the optical path OP3 provided to radiate light from the side of the bonding rib 464 toward the first application portion 467 of the bonding portion 526 opposite to the bonding rib 464.

Therefore, the adhesive applied to each of the inner first application portions 467 and 469 can be sufficiently irradiated with ultraviolet light. Therefore, the bonding strength of each of the bonding portion 526 between the holding member 434 and the bonding rib 458 and the bonding portion 526 between the holding member 434 and the bonding rib 459 can be enhanced. After the position of the holding member 434 which supports the light source 410Bk is three-dimensionally adjusted with respect to the laser holder 414, the holding member 434 can be fixed to the laser holder 414 with high reliability.

The holding member 434 is preferred to be formed of a non-transparent member.

As illustrated in FIG. 3, the laser holder 414 to which the holding members 433 and 434 are fixed is fixed to the housing 403 with the screws 491. The laser holder 414 may be fixed to the housing 403 with other fixing member such as an adhesive than the screws 491.

In the same manner, the positions of the holding member configured to hold the light source 410Y and the holding member configured to hold the light source 410M are adjusted, and then the holding members are bonded to a laser holder 415.

As described above, the V-shaped bonding ribs 458, 459, 464, and 465 are shaped so as to avoid (bypass) the UV irradiation optical paths OP1, OP2, OP3, and OP4, that is, the UV irradiation fibers 456 and 457. The V-shaped bonding ribs 458, 459, 464, and 465 are shaped in a manner that one limb on the inner side (side of the holding member opposed to the holding member to be held) is shorter than the other limb on the outer side (open side) opposite to the one limb so as to secure the UV irradiation optical paths OP1, OP2, OP3, and OP4.

As described above, the dispensers 451 and 452 are inserted from the open side, and hence the adhesive dropped from the dispensers 451 and 452 passes through each of the minimum gap points of the bonding portions 516 and 526. Therefore, the positions of the adhesive applied to the inner first application portions 467 and 469 and second application portions 447 and 449 do not fluctuate. Therefore, even when the one inner limb of the V-shaped bonding protrusion is short, the adhesive does not overflow from the bonding protrusion.

Further, as illustrated in FIG. 1B, the lens barrel portion 436 which protrudes from the laser holder 414 is arranged so as to avoid interfering with the UV irradiation optical path OP3, that is, the UV irradiation fiber 456.

Further, bearing surfaces 481, 482, 483, and 484 provided with the openings 442 through which the screws 491 pass, respectively, may be protruded from the laser holder 414. In such a case, it is preferred that the bearing surfaces 481, 482, 483, and 484 be arranged so as to avoid interfering with the UV irradiation optical paths OP1, OP2, OP3, and OP4, that is, the UV irradiation fibers 453, 454, 456, and 457. As described above, it is preferred that the lens barrel portion 436 and the bearing surfaces 481, 482, 483, and 484 configured to receive fastening loads of the screws 491, which protrude from the laser holder 414, be arranged so as to avoid interfering with the UV irradiation optical paths.

In this embodiment, the holding member is bonded to the laser holder, but the present invention is not limited thereto. The holding member may be bonded to the housing. The bonding protrusion may be protruded from the side surface of the housing. In this case, it is preferred that the lens barrel portion and the bearing surfaces be provided to the housing.

According to this embodiment, the following simple configuration can be realized. That is, the plurality of light sources are three-dimensionally adjusted with respect to the housing, and then the plurality of light sources are bonded to the housing.

According to this embodiment, a gap for radiating light toward the application portion of the photocurable resin adhesive is formed, and hence the distance among the plurality of light sources of the light scanning apparatus can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-055016, filed Mar. 18, 2013, which is hereby incorporated by reference herein in its entirety.

What is claimed is:

1. A light scanning apparatus, comprising:
a first holding member configured to hold a first light emitting element configured to emit a first light beam;
a second holding member configured to hold a second light emitting element configured to emit a second light beam;
a rotary polygon mirror having a plurality of reflective surfaces, the rotary polygon mirror being configured to deflect the first light beam and the second light beam so that the first light beam is scanned on a first photosensitive member by the plurality of reflective surfaces and the second light beam is scanned on a second photosensitive member by the plurality of reflective surfaces;
a housing in which the rotary polygon mirror is mounted; and
a mounting member to be mounted on the housing, the mounting member including a first mounting portion on which the first holding member is mounted, and a second mounting portion on which the second holding member is mounted, the second mounting portion being provided adjacent to the first mounting portion to cause the first light beam and the second light beam to enter the same reflective surface among the plurality of reflective surfaces,
wherein the first holding member is bonded to the mounting member with a photocurable resin adhesive applied to a first application portion provided between the first holding member and the first mounting portion on a side of the second mounting portion,
wherein the mounting member is provided with a gap formed between the first mounting portion and the second mounting portion to radiate light from between the first mounting portion and the second mounting portion toward the first application portion,
wherein the first light emitting element and the second light emitting element are arranged in a manner that the first light beam and the second light beam enter the plurality of reflective surfaces from different sides with respect to an imaginary plane that has a normal line corresponding to a rotary shaft of the rotary polygon mirror and passes through the rotary polygon mirror,
wherein a first lens configured to convert the first light beam into collimated light and a second lens configured to convert the second light beam into collimated light are mounted in the mounting member,
wherein the first mounting portion has a V-shape including two limbs in a cross section perpendicular to a bisector of an angle formed by an optical axis of the first lens and an optical axis of the second lens,
wherein the two limbs are opened toward a side opposite to the first holding member, and wherein one limb of the two limbs on the side of the second mounting portion is shorter than other limb of the two limbs on a side opposite to the side of the second mounting portion.

2. A light scanning apparatus according to claim 1,
wherein the second mounting portion has a V-shape including two limbs in the cross section,
wherein the two limbs of the second mounting portion are opened toward a side opposite to the second holding member, and
wherein one limb of the two limbs of the second mounting portion on a side of the first mounting portion is shorter than other limb of the two limbs of the second mounting portion on a side opposite to the side of the first mounting portion.

3. A light scanning apparatus according to claim 1,
wherein the second holding member is bonded to the mounting member with a photocurable resin adhesive applied to a second application portion provided between the second holding member and the second mounting portion on a side of the first mounting portion, and
wherein the photocurable resin adhesive applied to the second application portion is cured with light radiated through the gap.

4. A light scanning apparatus according to claim 3,
wherein the first mounting portion is bonded to the mounting member with a photocurable resin adhesive applied to a third application portion provided between the first holding member and the first mounting portion on the side opposite to the side of the second mounting portion, and
wherein an amount of the photocurable resin adhesive applied to the first application portion is smaller than an amount of the photocurable resin adhesive applied to the third application portion.

5. A light scanning apparatus according to claim 4,
wherein the second holding member is bonded to the mounting member with a photocurable resin adhesive applied to a fourth application portion provided between the second holding member and the second mounting portion on a side opposite to the side of the first mounting portion, and
wherein an amount of the photocurable resin adhesive applied to the second application portion is smaller than an amount of the photocurable resin adhesive applied to the fourth application portion.

6. A light scanning apparatus according to claim 1, wherein the second mounting portion has an initial positioning plane to adjust a position of the second holding member.

7. A light scanning apparatus according to claim 1, wherein the first mounting portion has an initial positioning plane to adjust a position of the first holding member.

8. A light scanning apparatus according to claim 1,
wherein the mounting member comprises a lens barrel portion to which the first light beam reflected by the rotary polygon mirror enters to detect a writing start position of the first light beam to be radiated to the first photosensitive member, and
wherein the lens barrel portion is provided on a part of the mounting member outside the gap through which the light is radiated from the side of the second mounting portion toward the first application portion.

9. A light scanning apparatus according to claim 1,
wherein the first mounting portion comprises a plurality of first mounting portions, and
wherein the second mounting portion comprises a plurality of second mounting portions.

10. An image forming apparatus, comprising:
a plurality of photosensitive members;
a light scanning apparatus as recited in claim 1, the light scanning apparatus configured to radiate a plurality of light beams modulated according to image information to the plurality of photosensitive members to form electrostatic latent images;
a developing device configured to develop the electrostatic latent images with toners to form toner images;
a transfer device configured to transfer the toner images onto a recording medium; and
a fixing device configured to fix the toner images onto the recording medium.

* * * * *